United States Patent [19]
Rethwish et al.

[11] Patent Number: 6,005,216
[45] Date of Patent: Dec. 21, 1999

[54] ADVANCED AUTOMATIC MACHINE FOR RAPIDLY FABRICATING NET METALLIC HONEYCOMB CORE

[75] Inventors: William F. Rethwish, Monterey; Raymond R. Listak, Chula Vista, both of Calif.; Todd P. Wood, New Braunfels, Tex.

[73] Assignee: Rohr, Inc., Chula Vista, Calif.

[21] Appl. No.: 09/150,230

[22] Filed: Sep. 9, 1998

[51] Int. Cl.$^6$ ............................ B23K 11/06; B23K 11/00
[52] U.S. Cl. ........................................ 219/78.11; 219/81
[58] Field of Search ............................ 219/78.11, 78.12, 219/81, 82, 83; 228/181

[56] References Cited

U.S. PATENT DOCUMENTS

| | | | |
|---|---|---|---|
| 2,821,616 | 1/1958 | Spott | 219/78.11 |
| 2,985,743 | 5/1961 | McKeen | 219/78.11 |
| 3,028,481 | 4/1962 | Covert | 219/78.11 X |
| 3,051,824 | 8/1962 | Wilson | 219/78.11 X |
| 3,064,116 | 11/1962 | Thomas et al. | 219/82 |
| 3,162,745 | 12/1964 | Rohr | 219/83 |
| 3,163,742 | 12/1964 | Rohr | 219/82 |
| 3,283,118 | 11/1966 | Runkle | 219/78.11 |
| 4,013,865 | 3/1977 | Jones | 219/78.11 |
| 4,642,436 | 2/1987 | Rethwish et al. | 219/78.11 |

*Primary Examiner*—Gregory Mills
*Attorney, Agent, or Firm*—Patrick J. Schlesinger

[57] ABSTRACT

An automatic machine for rapidly fabricating a continuous length of metallic honeycomb core having a finite width and a precise height for use, substantially as fabricated, in bonding in a honeycomb core panel structure from a continuous strip of preformed metal foil having spaced crest and trough sections. The machine includes a fixed central foil guide that directs a continuous strip of metallic foil to a horizontally translatable guide that positions the foil strip between two banks of vertically biased banks of individual weld blocks having sets of vertically disposed weld pin electrodes. A spreader carriage that is horizontally translatable in synchronism with the translatable guide momentarily spreads individual opposed biased weld blocks to permit the foil strip to be laid against a previously received portion of such foil strip in horizontal and vertical registry of the crests and troughs of the preformed strip. As the foil strip is so positioned, the two opposing sets of weld wheel electrodes are sequentially actuated to weld the vertically registered crests and troughs of foil together in precise horizontal and vertical alignment in a continuous sequential wave-like motion.

40 Claims, 18 Drawing Sheets

ADVANCED AUTOMATIC MACHINE FOR RAPIDLY FABRICATING NET METALLIC HONEYCOMB CORE

BACKGROUND OF THE INVENTION

1. Field of the Invention

The present invention is directed to an improvement in the fabrication of metallic honeycomb core and more particularly, but not by way of limitation, to an automatic machine for rapidly manufacturing metallic honeycomb core material having a finite width and precise height from a continuous metal foil strip material, which honeycomb core is suitable for ultimate use substantially as it is fabricated.

2. Description of the Related Art

Many manufacturing processes, such as welding, require that several parts be brought together and assembled precisely at a work station, held there in such assembled relation for the duration of the welding period and then moved from the work area to make way for successive parts to be introduced, assembled, and acted upon therein. An example of this type arises in the manufacture of metallic honeycomb. In fabricating this honeycomb core, strip feed and positioning means comprising inter-nesting electrode and indexing pins juxtaposed sections of corrugated metal ribbon or strips so that troughs of one strip rest on the crests of an adjacent strip. The strips are then held in this position while contacting electrode pins on the upper and lower welding assemblies and welding wheels on the weld wheel assemblies pass welding current through the abutting nodes of the adjacent crests and troughs to weld the same together and form adjacent cells of the honeycomb core. When selected crests and troughs have been welded together, the electrode pins and welding members are withdrawn from the formed cell and, following the shuttling of the core by the indexing pins, the indexing pins are re-inserted and re-applied as the process is repeated, as necessary, to complete the desired core.

For a completely satisfactory result in providing high quality honeycomb core, the juxtapositioning of the strip sections must be very precise; the pressure, movement and electrical contacting of the welding members must be critically controlled and precision positioning, alignment, and movement of the parts must prevail repetitively in the cell-to-cell formation though the length and width of the honeycomb core.

Various honeycomb core machines have heretofore been proposed and used with varying degrees of success. Examples of prior art machines for producing honeycomb core are found in U.S. Pat. Nos. 2,927,991 by W. A. Schoelz; 3,070,686 by P. Vinson et al.; 3,077,533 by F. H. Rohr et al.; 3,092,711 by H. B. Bennett et al. and 3,108,368 by C. W. Christinan.

In general, these prior art machines require that the maximum width of the honeycomb core material is either dictated by the number of weld electrode positions or that the honeycomb core, or such portion produced of it, be horizontally translated back and forth by the operator or other means so that a width greater than the number of weld electrode positions can be accomplished. The prior art machines also produced wavy or uneven surface core which had to be later trued due to the use of a single set of wheel weld electrodes. Also, in order to get a precise dimensional honeycomb core material, a thick blanket was produced initially, then this blanket was sliced or machined to obtain the desired width, length and thickness. This operation is very labor intensive and produces a considerable amount of waste.

Another prior art machine of interest is seen in U.S. Pat. No. 4,642,436 by W. F. Rethwish et al, which patent is assigned to the present assignee. This patent discloses an automatic machine for producing a continuous length of honeycomb core material of finite width and height from a continuous strip of corrugated ribbon material. This machine includes a main frame and transport assemblies. The transport assembly carries a corrugated ribbon laying means which positions a layer of corrugated ribbon strip between horizontally displaced upper and lower weld electrode assemblies as the transport assembly shuttles back and forth across the main frame assembly. The transport assembly also carries a welding means which is vertically translatable to a welding position in contact with the layer of corrugated ribbon strip.

The operation of this machine provides for the transport assembly to lay a predetermined portion of the corrugated ribbon between the upper and lower weld electrode assemblies commensurate with the width of the welding means. The welding means is then actuated to weld such portion of the corrugated ribbon strip to a previously positioned portion of such ribbon strip. The transport assembly is then moved along the main frame a predetermined distance to lay an additional portion of corrugated ribbon and then stopped where the welding process is repeated. This transport, dwell for welding, and continued transport of the transport assemblies along a track on the main frame is repeated until the desired width of honeycomb core has been fabricated. While honeycomb core fabricated by this machine has a finite width and height it is desired to fabricate such honeycomb core of equal or enhanced quality on a more rapid basis.

A need therefore exists for an improved machine that can rapidly fabricate metallic honeycomb core having a predetermined width and a precise height and which is suitable for ultimate use substantially as fabricated without having to be subjected to further processing in order to prepare such core for ultimate use. The fabrication of honeycomb core having a precise net height without having to be subjected to further processing is very desirable since a need for net metallic core has substantially increased. Net metallic core is advantageously used in the manufacture of metallic honeycomb core panels wherein the metal honeycomb core is bonded to metal face skins by a suitable metal joining process which requires all facing surfaces of such core to precisely meet the planar surfaces of the metal faces. Net metal core is also desirable in the manufacture of honeycomb core panels that are adhesively bonded together.

Yet another prior art metal honeycomb welding apparatus of interest is U.S. Pat. No. 4,013,865 issued to E. E. Jones which is directed to a metal honeycomb welding apparatus having a number of finger electrodes that are insertable into a honeycomb core panel. A welding means provides for carrying a corrugated metal strip to a welding station by means of weld heads which position such strip for welding. The weld heads include welding elongated members which advance into a welding position where a number of "tit-like" projections on an edge face of a corrugated metal strip are to be welded. After welding of one weld face of the strip, the welding elongated members are withdrawn, indexed and again translated forwardly to another welding position. Such cycle is repeated until the number of desired welds is accomplished. This apparatus does not appear to fabricate metallic honeycomb core having a precise net vertical height and it is obviously limited in the speed with which it can fabricate metal core.

It is a principal objective of the present invention to provide an improved machine to fabricate at high production rates a continuous length of metallic honeycomb core of finite width and precise height that is substantially suitable for ultimate use as it exits the machine.

It is a second principal objective of the present invention to provide an improved machine for rapidly fabricating honeycomb core that is substantially net in height and of great uniformity and high quality.

It is another objective of the present invention to provide a machine that produces net metallic honeycomb core at relatively high production rates.

It is another objective of the present invention to provide a machine for rapidly fabricating metallic honeycomb core which has uniform high quality welds at abutting nodes of the continuous metal foil strip comprising the core.

It is yet another objective of the present invention to provide a machine for fabricating metallic net honeycomb core by reversibly feeding a continuous strip of metal foil successively through a plurality of sequential weld stations positioned along a main frame to fabricate the net honeycomb core in one relatively continuous movement.

It is another objective of the present invention to provide a machine for fabrication of metallic net honeycomb core by sequentially welding a set of nodes of a continuous deformed metal strip, as it is positioned in place with a series of non-translating weld head assemblies which span the entire width of the honeycomb core.

It is still another objective of the present invention to provide a machine for fabricating net metallic honeycomb core from a continuous metal foil strip which provides for upward rotation of the foil positioning mechanism and welding mechanism from their operative positions to expedite maintenance of the machine and to reduce the time required to reconfigure the machine to make honeycomb core of another size.

The foregoing has outlined some of the more pertinent objects of the invention. These objects should be construed to be merely illustrative of some of the more prominent features and application of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

Briefly stated, the present invention contemplates achieving the foregoing and other objectives of the invention by providing an automatic machine for rapidly fabricating a continuous length of honeycomb core having a determinable width and precise height and being suitable for use in bonding in a honeycomb core panel structure substantially as fabricated from a continuous strip of preformed preferably corrugated metal foil having spaced crest and trough sections. The machine includes a continuous metal foil strip guiding means to direct a continuous preformed metal foil strip having spaced crest and trough sections at a determinable speed for a predetermined length in a reversible predetermined direction for the welding of such foil strip into a honeycomb core. This guide means is provided by a central fixed guide portion and translatable horizontally spaced guide portions, certain of such translatable guide portions being reversible and horizontally translatable together at a predetermined speed to position the foil strip in a predetermined location in a continuous motion.

The machine includes means to receive the continuous metal foil strip from the foil guiding means and to position first and second portions of the metal foil for contacting horizontal registry of crests of the first portion with troughs of the second portion of the foil strip so that such portions are in substantially precise vertical registry and present nodes for welding into honeycomb core.

The receiving means includes upper and lower parallel rows of weld blocks which are arranged in sets and that are individually vertically biased to contact the upper and lower surfaces of the metal foil strip as crests and troughs of such corrugated metal strip are brought into horizonal registry with the troughs and crests or a previously received portion of such foil strip to provide nodes for welding such portions together. The biasing of such upper and lower sets of weld blocks brings such contacting portions of the foil strip into precise vertical registry whereby upon being welded together the resultant metallic honeycomb core is at net height and is substantially ready for ultimate use, such as being bonded into a honeycomb core panel.

The biased individual weld blocks are urged away from their normal foil contacting position by a horizontally translatable roller means that cooperates with such individual blocks and is brought into operative contact with such blocks by being driven just ahead of the translatable foil guide members so that the weld blocks are urged apart to permit the lay down or positioning of the metal foil strip by a translatable guide member and thereafter are normally vertically biased after passage of such roller means to ensure that the contacting unwelded portions of the foil strip are brought into precise vertical registry.

Each weld block is also provided with a row of vertically extending pin weld electrodes that are arranged horizontally and parallel to the direction of the positioning of the metal foil strip. Each weld block inserts a pin weld electrode, which has a cross section of four outwardly extending arms, into each cell formed by the registry of the crests and troughs of one portion of the foil strip with crests and troughs of another section of such foil strip to provide nodes for welding. The four arms extend at 90 degrees from one another and contact a wall of such cell with one arm contacting a crest and trough horizontal registry of two portions of the metal foil to act as a secondary weld electrode.

A welding means provided by upper and lower banks of sets of vertically translatable weld wheels which are translated vertically and interleave to provide primary weld electrodes for the resistance welding together of such nodes of the vertically and horizontally registered portions of the metal foil strip. By interleaving the weld wheels during the vertically translating welding step the pressures exerted by such wheels on the foil strip are evened out. The weld wheels of each set are vertically translated in a welding procedure immediately after translatable foil guide members have positioned a portion of the metal foil strip in a vertical and horizontal registry position so that the lay down of such strip and the sequential immediate welding process of a set of weld wheels continues in one continuous wave-like process as the foil guide means horizontally translates back and forth to lay down the metal foil strip in a desired position.

A means is provided to advance rearwardly such welded portion of the honeycomb core after each horizonal pass of the foil guiding means and the sequential welding step. This advancing means is provided by a shuttle rocker bar assembly which is operatively associated with the upper and lower banks of weld blocks with the vertical pin electrodes extending vertically into two rows of cells of the honeycomb core being fabricated. The shuttle rocker bar assembly includes cam means which cause, upon completion of the welding procedure for a complete horizonal pass of the foil guiding means to lay down a complete horizontal portion of the foil strip with the welding process being sequentially initiated, one bank of weld blocks to be vertically translated to withdraw the attached weld pin electrodes from the welded honeycomb core and after such bank of weld blocks is horizontally vertically translated in an opposing direction to position each weld pin electrode within a cell position of a portion of the honeycomb core for application of the foil strip thereagainst in vertical and horizontal registry positions for reinitiation of the welding process.

As one bank of weld blocks is advanced forwardly a predetermined distance simultaneously the opposing other bank of weld blocks is translated rearwardly without vertical translation of the attached weld pin electrodes whereby the weld pin electrodes of such other bank draws the welded unitary honeycomb core rearwardly a predetermined distance. Also, spaced retainer bars having at least one comb shaped portion contact the outer forward vertical faces of the honeycomb core as it is being fabricated and permit a bank of weld blocks to withdraw the attached weld pin electrodes from their operative positions within cells of such honeycomb core without tending to draw vertically the edge of the honeycomb core as such weld pin electrodes are being vertically translated.

Preferably the foil guiding means, the receiving means, welding means and advancing means are mounted on a main frame which has a table slantingly affixed to it for receiving the honeycomb core as it is fabricated. The foil guiding means and the welding means are operatively associated and hingedly connected to the main frame whereby such elements may be rotated upwardly a sufficient distance to permit access to remaining elements of the machine for easy maintenance and to install weld blocks and attached weld pin electrodes of a predetermined size for the purpose of adjusting the vertical height and cell size of the honeycomb core.

A suitable electric resistance welding system is provided for the welding means and the aforesaid sequential operation of the above noted elements is controlled by suitable pneumatic means and electric servo motors, all of which is suitably controlled by a programmable computer.

The foregoing has outlined rather broadly the more pertinent and important features of the present invention in order that the detailed description of the invention that follows may be better understood so that the present contributions to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 4A is a detail perspective that illustrates two opposing individual weld blocks with weld pin electrodes and interleaved weld wheels in a welding position.

Similar numerals refer to similar parts in all FIGURES.

DETAILED DESCRIPTION OF THE PREFERRED EMBODIMENT

Figure 1:
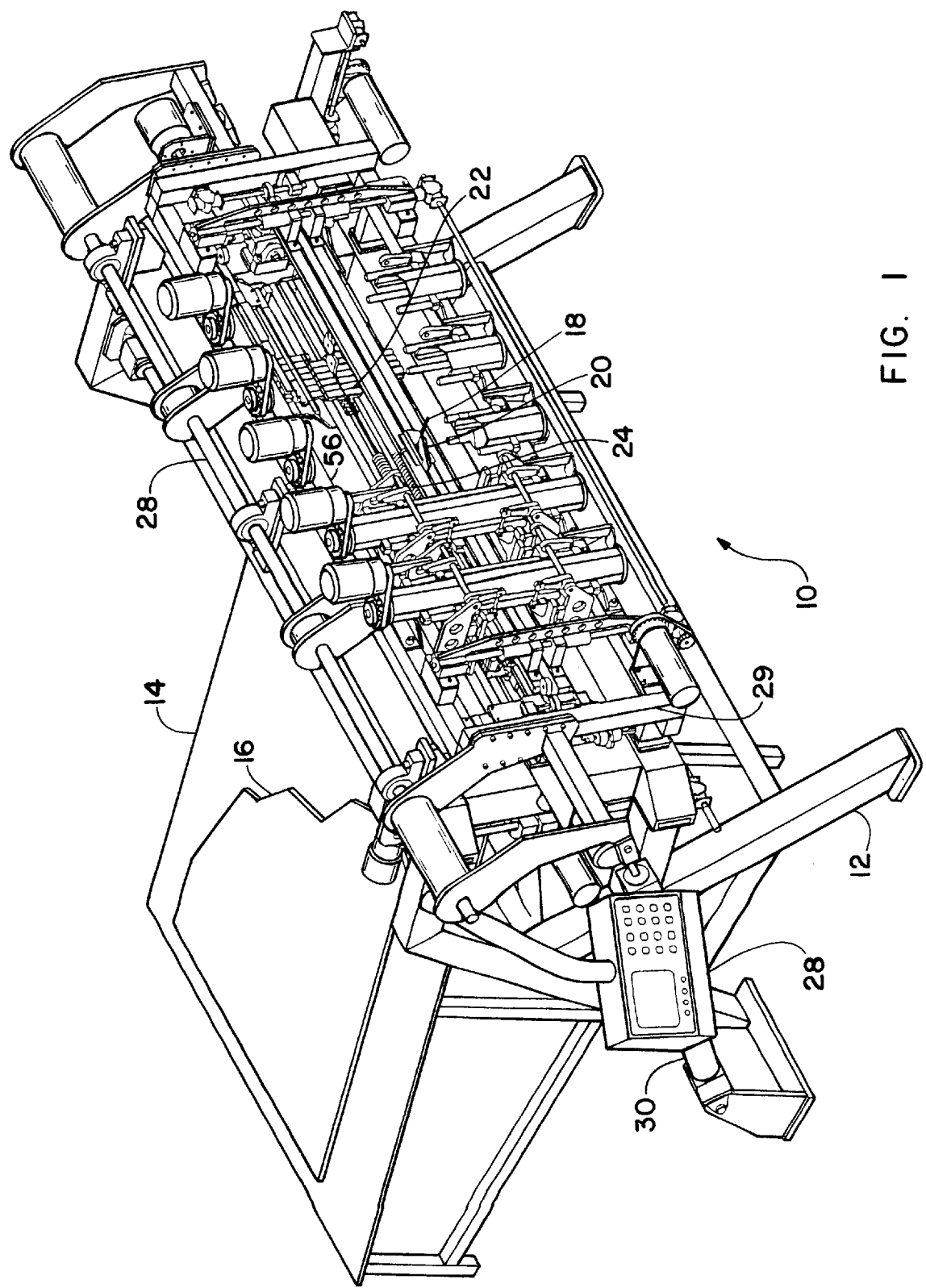
FIG. 1 is a front perspective that shows an automatic machine for fabricating metallic honeycomb core having a finite width and a precise height that is constructed in accordance with the present invention.
Figure 2:
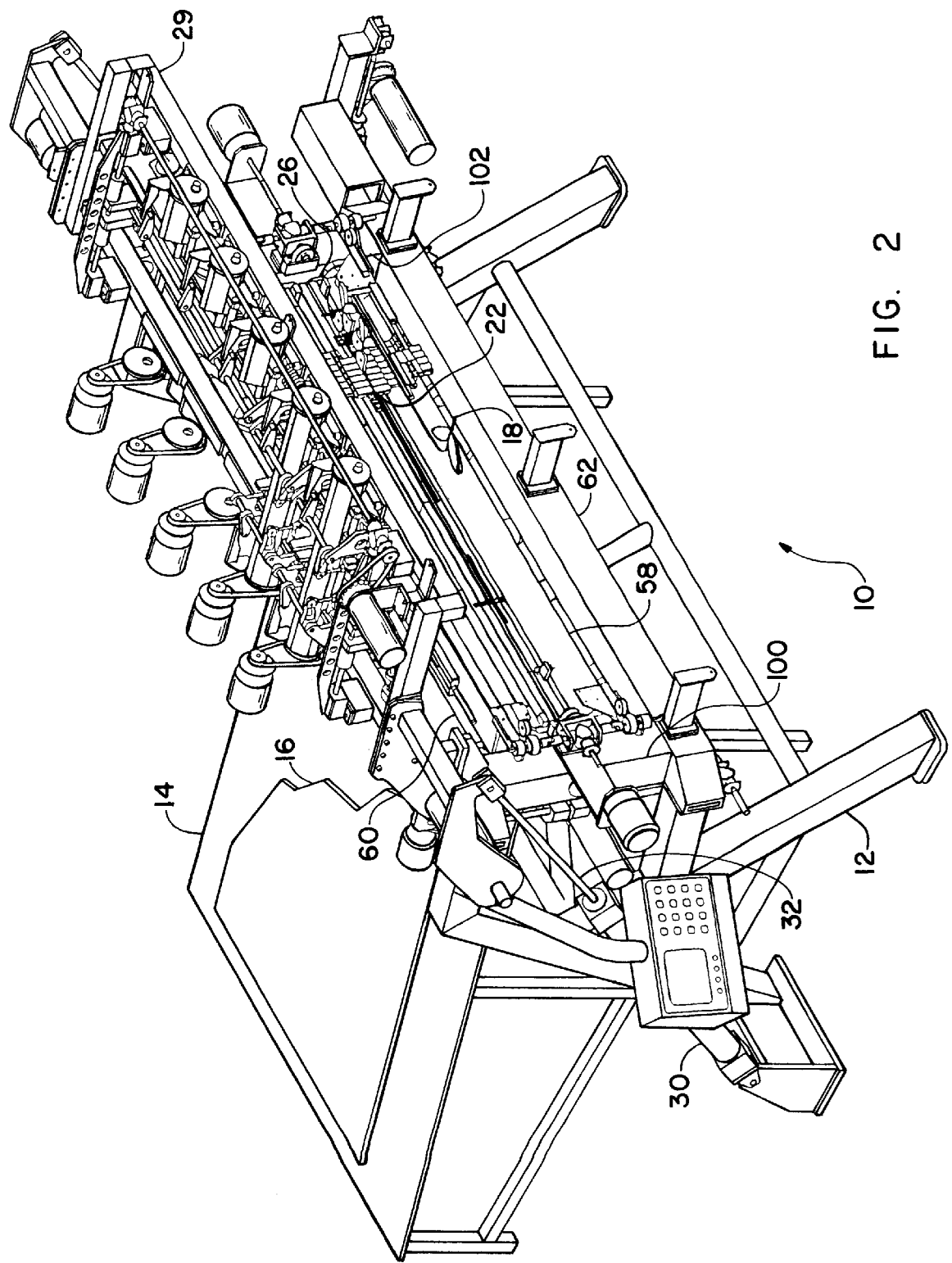
FIG. 2 is a front perspective of the automatic machine seen in FIG. 1 in which the metal foil strip guide means and the welding means have been rotated upwardly to a desired position in order to provide easy access to elements of the machine.
Figure 3:
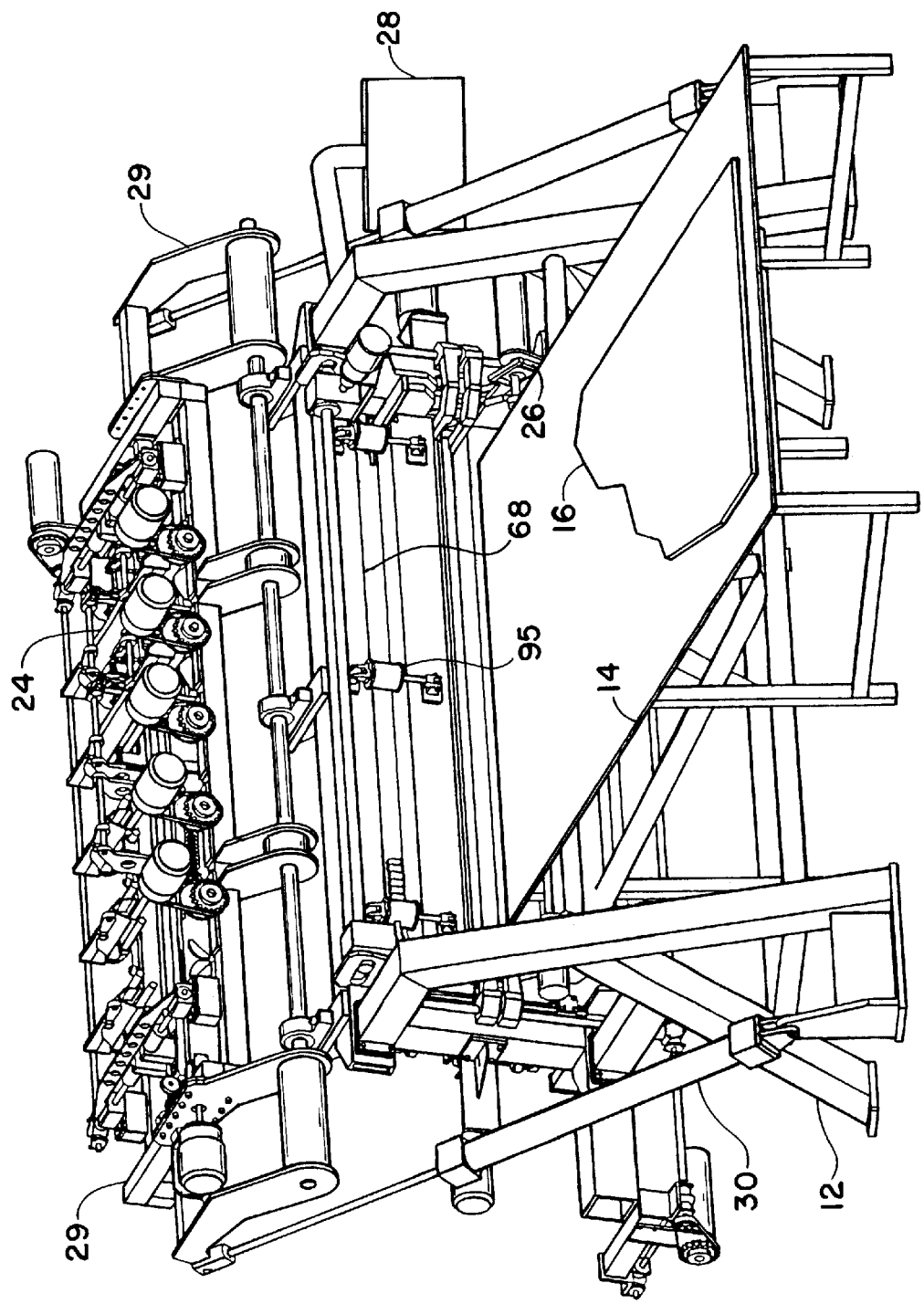
FIG. 3 is a rear perspective of the machine in the position FIG. 2.

Referring now to the drawings in detail and in particular to FIGS. 1–3, reference character 10 generally designates an automatic machine that rapidly and efficiently fabricates metallic honeycomb core having a finite width and a precise height that has been constructed in accordance with a preferred embodiment of the invention. The machine 10 includes a suitable mainframe 12 for supporting the various cooperating elements of the machine 10. The mainframe 12 is provided with an attached sloping table 14 for receiving the metallic honeycomb core 16 (shown cut away) as it is fabricated. The table 14 is sloped away from the portion of the machine 10 which fabricates the honeycomb core 16 to permit the core 16, assisted by force of gravity, to be translated aft as it is fabricated. The surface of the table 14 may be coated with a suitable lubricous surface treatment to reduce the drag between the surface of the table 14 and the honeycomb core 16.

The machine 10 receives a continuous strip 18 of metallic preformed foil that is preferably corrugated for providing enhanced compressive and shear strength when bonded, either metallically or adhesively, into a desired honeycomb core panel. The metallic foil strip 18 is preferably received from a manufacturing source and is suitably deformed by a means, such as a foil strip gear former (not shown), in a location adjacent to the machine 10 to provide such strip 18 with corrugations and spaced crests and troughs.

The continuous metallic deformed metal strip 18 is received by a guide means, generally designated 20, and is guided in a reversible predetermined horizontal direction for the welding of such foil strip 18 into a honeycomb core 16 having a predetermined width and a precise vertical net height to provide a core 16. The metal foil strip 18 is guided by the guide means 20 to be received by a receiving means, generally designated 22, which receives first and second serial portions of the metal foil strip and positions them for contacting precise horizonal and vertical registry of crests and troughs of the first portion with troughs and crests of a second portion of such foil strip 18. The first serial portion of the metal foil strip 18 may be considered to be that portion of the metal foil strip 16 which extends horizontally from one side of the intended honeycomb core 16 to the other side of the core 16 to provide a serial portion having a predetermined length equal to the intended width of the honeycomb core 16. Thus, the guide means 20 guides a second portion of the continuous foil strip 18 in a reversed direction after completing one horizontal traverse to provide a second serial portion of the metallic foil strip 18 that is received by the receiving means 22 and positioned against the first serial portion of the foil strip 18 to provide precise vertical registry of the first and second serial portions of the metal foil strip and also precise horizontal registry of the crest of the first serial portion with a trough of the second serial portion and vice versa, as seen clearly in FIGS. 10 and 11.

As the receiving means 22 serially receives the second serial portion of the metal foil strip 18 and positions it with the first portion in a precise vertical and predetermined horizontal registry, a welding means, generally designated 24, comprising opposed horizontally disposed vertical spaced banks of sets of spaced welding wheels, is sequentially actuable to bring determined opposed sets of such welding wheels into welding contact with the abutting crests and troughs of the first and second portions of the metallic foil strip for welding of such portions together to fabricate the metallic honeycomb core 16. Thus, the welding procedure of the machine 10 may be considered to represent a "wave" motion or "zipper" like motion as the metal foil strip 18 serially positioned by the receiving means 22 and thereafter, as the laying down of the foil strip 18 proceeds horizontally, the welding means 24 proceeds to weld the first and second portions of the foil strip together in a sequential continuing operation that is materially faster in the fabrication of the honeycomb core than prior art devices.

Following completion of the welding of the first and second serial portions of the continuous foil strip 18 to provide the initial width of the honeycomb core 16 an advancing means, generally designated 26, in the form of a rocker bar drive assembly shuttles the then fabricated portion of the honeycomb core aft by a predetermined distance generally equal to one-half of the longitudinal size of the cell provided by the welding together of opposing crests and troughs of the first and second portions of the metallic foil strip 18 at the nodes thus presented. The guide means 20 then reverses the direction of its horizontal traverse to lay down or position a subsequent portion of the foil strip 18 against the second portion of the strip 18 so that the previous second portion of the foil strip may then be considered to be a first portion and the subsequent portion of the foil strip 18 may be considered to be a second serial portion. Thus, the guide means 20 continues to reversibly guide the foil strip 18 back and forth as previously described for sequential welding and aft translation of the honeycomb core 16 as it is being fabricated until a honeycomb core 16 having a determinable finite width and length and a precise vertical height. Thus, the honeycomb core 16 as manufactured is substantially ready for being incorporated in a honeycomb core panel as fabricated or with very minimal subsequent processing.

The machine 10 includes a programmable electronic computer 28 which is operable to control the plurality of electrical motors, servo motors, and pneumatic means in desired precise sequences for the control and operation of the guide means 20, the receiving means 22, the welding means 24 and the advancing means 26.

The machine 10 has another desirable feature in that the guide means 20 and the welding means 24 are hingedly secured to the mainframe 12 by a suitable rotatable weld frame 29 and can be rotated upwardly to an open secured position, as seen in FIGS. 2 and 3, by actuation of suitable counterbalance assembly 30 having a pneumatic actuator 32. When the guide means 20 and the welding means 24 carried on the weld frame 29 have been rotated upwardly to an open position as seen in FIG. 2, easy access is provided to the major components of the machine 10 for maintenance purposes and for reconfiguring the machine 10, as necessary, for the fabrication of honeycomb core 16 of predetermined desired sizes of height and width.

Figure 4:
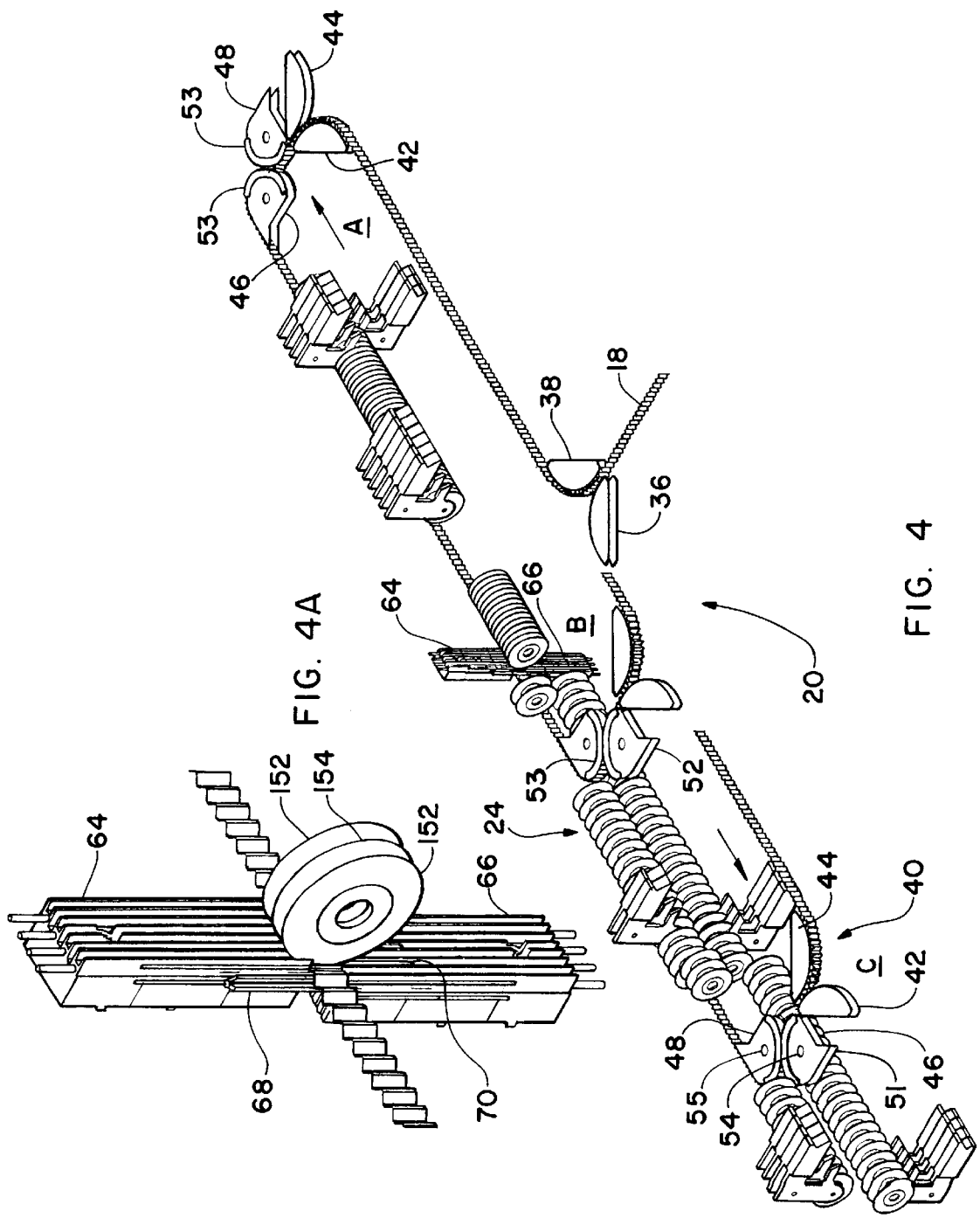
FIG. 4 is a simplified perspective of the metal foil guide means element of the machine of FIG. 1 and illustrates how such guide means positions such corrugated deformed metal foil for sequential welding by the welding elements.

Referring now to FIGS. 4 and 4A, guide means 20 will be seen to include a fixed guide portion 34 comprising two spaced arcuate guide portions 36 and 38 that are provided with inner arcuate portions. The metal foil strip 18 is received between the guide portions 36 and 38 and then follows the arcuate portion of one guide portion 36 or 38 in a desired horizontal direction. The guide means 20 also includes a horizontally translatable spaced foil strip guide portion 40. The translatable guide portion 40 includes a first non-rotatable translatable portion comprising two opposed spaced guide portions 42 and 44, each having an arcuate outer portion so that the foil strip 18 may be received from the fixed guide members 36 and 38 and guided from a horizontal direction to a direction normal to the planar face of the receiving means 22 regardless of the direction of horizontal translation of the translatable portion of the guide means 20. The translating portion 40 also includes two spaced rotatable paddle or guide portions 46 and 48.

As seen in FIG. 4, the guide portion 46 has spaced upper and lower guide portions 50 and 52 that have extending tang or tail portions 51 and outer flanges 53 to assist in positioning the foil strip 18 and are determinably vertically spaced on central rods 54 and 55. The foil strip 18 after exiting between the two fixed translatable guide members 42 extends between the rotatable guides 46 and 48 to contact outer edges of the upper and lower guide members 50 and 52 and is further guided by being constrained in vertical movement by the upper and lower flanges 53 on guide portions 50 and 52 as the foil strip 18 is positioned against the receiving means 22. As the foil strip 18 is positioned or laid down against the preceding portion of the foil strip 18 it is held in vertical registry and in horizontal registry by the opposing biased individual weld blocks and rows of weld pin electrodes, as seen in FIG. 4A, so that crests and troughs of succeeding layers of the foil strip 18 provide nodes for welding together such layers of the foil strip 18. The sets of welding wheels 24 then vertically translate to weld the nodes of the foil strip 18.

As seen in FIG. 4, the translating guide portion 40 of the guide means 20 is seen on the right side in position A and may be presumed to be translating in the direction of the adjacent arrow. When the translating guide portion 40 has translated a predetermined distance in that direction, the direction of translation of the guide portion 40 is reversed to lay down the foil strip 18 in an opposing direction. As the direction of translation of the guide portion 40 is reversed, the guides 46 and 48 are rotated approximated 90 degrees each in a counter-clockwise direction and positions of the center pins 54 of each guide 46 and 48 are moved inwardly and outwardly a predetermined distance to assume the position seen at B in the upper right hand portion of FIG. 4. The translatable guide portion 40 is then translated in an opposing direction, as seen in position B to lay down the foil strip 18 in a predetermined position. The translating guide portion 40 would then continue to translate horizontally to lay down the foil strip 18 in a desired position until it reaches a position C, shown to the left in FIG. 4 where it reaches a desired horizontal position where it is stopped momentarily to reverse the position of the guides 46 and 48 back to the position seen at position A and the direction of guidance of the foil strip 18 is then reversed.

Figure 5:
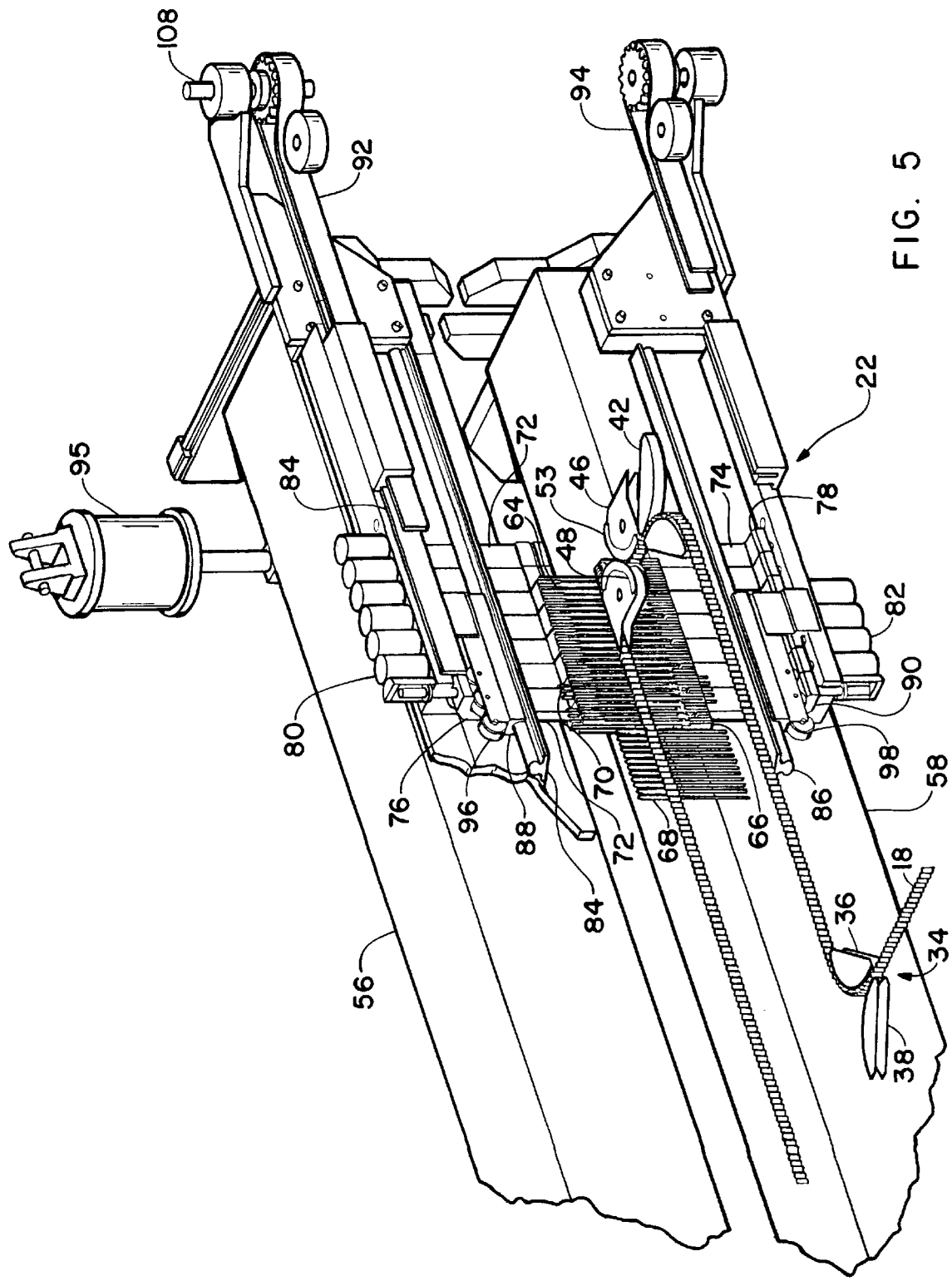
FIG. 5 is a simplified perspective that illustrates the cooperative interaction of the metal foil guide means with the metal foil receiving means to serially position portions of the metal foil strip for welding into honeycomb core.
Figure 10:
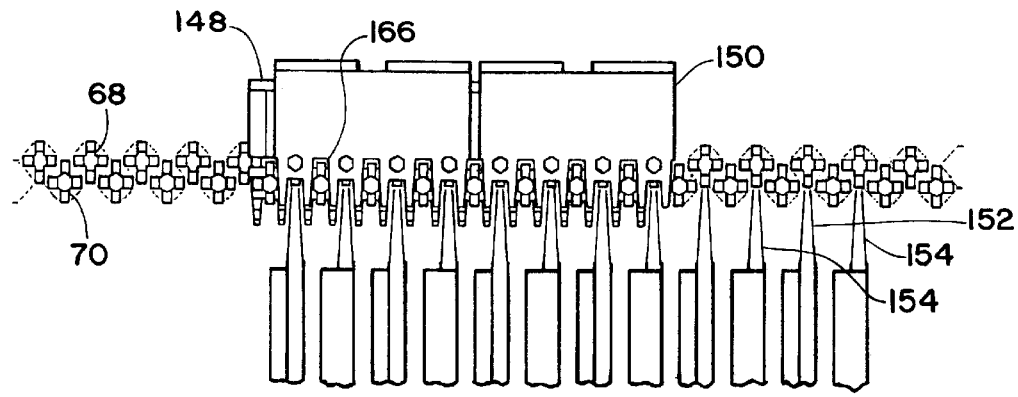
FIG. 10 is a top view of honeycomb core to show the position of the weld wheel electrodes and the weld pin electrodes in a first position of a sequence.
Figure 11:
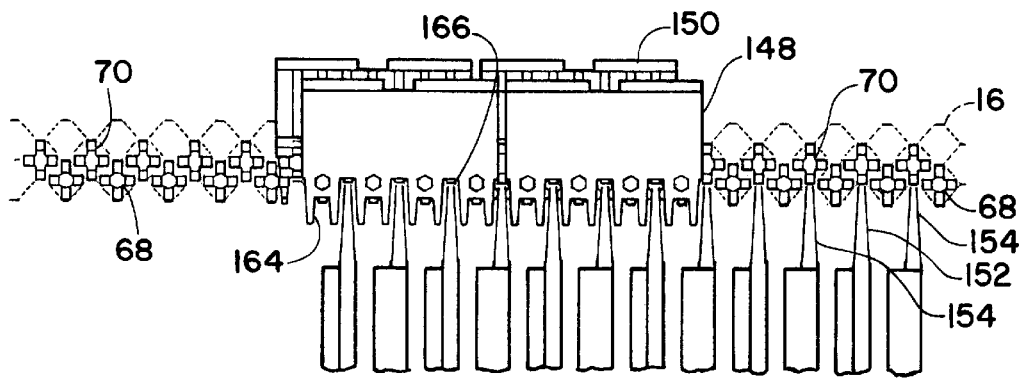
FIG. 11 is another top view of honeycomb core to show the position of the weld wheel electrodes and the weld pin electrodes in a second position of a sequence.
Figure 12:
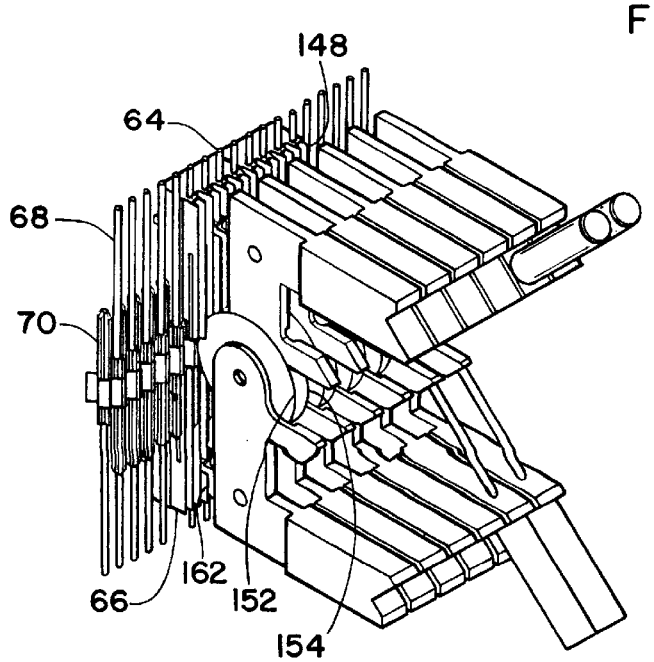
FIG. 12 is a perspective of the insertion of opposing weld pin electrodes in a section of honeycomb core being fabricated.

Referring now to FIG. 5, the receiving means 22 for receiving the foil strip as it is laid down and positioning it in vertical and horizontal registration will be described in greater detail. The receiving means 22 includes two vertical spaced carriage beams 56 and 58 which are operatively associated with the main beams 60 and 62, seen in FIGS. 2 and 3, that form a horizontal support portion for the mainframe 12. The spaced carriage beams 56 and 58 each carry a bank of horizontally extending sets of weld blocks 64 and 66 respectively, only a portion of which weld blocks 64 and 66 are illustrated for purposes of clarity. The weld blocks 64 and 66 have a plurality of removable vertically extending horizontally arranged weld pin electrodes 68 and 70 respectively, which pin electrodes are removably positioned in the cells formed by the horizontal registry of portions of the foil strip as seen in FIGS. 10–12. These weld pin electrodes 68 and 70 act as secondary weld elements in an resistance welding circuit when the welding of the nodes of the horizontally registered first and second portions of the foil strip 18 is accomplished by primary weld electrodes provided by the rotatable weld wheels of the welding means 24.

Each of the weld pin blocks 64 and 66 is attached to a vertically extending flange member 72 and 74, respectively, that has an outwardly extending portion 76 and 78, respectively at its upper end. Each portion 76 and 78 is secured to an individual spring arrangement 80 and 82, respectively, which biases the connected weld block 64 or 66 in a direction to contact the upper and lower surfaces of the first and second portions of the foil strip 18 as it is positioned in machine 10 by the guide means 20 and bring them into precise vertical registry for sequential welding by the weld wheels of the weld means 24 after such positioning.

In order to position the foil strip 18 between the opposing faces of the biased opposed banks of weld pin blocks 64 and 66, such blocks 64 and 66 must be slightly separated from contact with edges of the foil strip 18 during the period in which the one portion of the foil strip 18 is laid against a previously positioned portion of the foil strip 18 to preclude interference with the opposing weld blocks 64 and 66 during such positioning step. This slight momentary separation of opposing weld blocks 64 is accomplished by providing upper and lower guide tracks 84 and 86 which slidably receive upper and lower biasing carriages 88 and 90. The guide tracks 84 and 86 are operatively secured to upper carriage beam 56 and lower carriage beam 58 respectively. The biasing carriages 88 and 90 are operatively connected to reversible upper and lower drive chains 92 and 94 respectively. Each biasing carriage 88 and 90 is provided with vertically extending rotatably wheels 96 and 98 which are brought into contact with the outwardly extending upper portions 76 and 78 of flange members 72 and 74 to urge such biased connected weld pin blocks 64 and 66 away from contact with the portion of the foil strip 18 being then positioned between the weld blocks 64 and 66 by the guide means 20.

After a portion of the foil strip 18 has been positioned against the previously positioned portion of the foil strip 18 by the by the passage of the biasing carriages 88 and 90, the spring elements 80 and 82 are permitted to again urge the weld blocks 64 and 66 inwardly into contact with such contacting portions of the foil strip 18 to assure precise vertical registry and horizontal registry of contacting crests and troughs of such portions of the foil strip 18 to provide nodes for welding. Thus, when the set of weld wheels of the welding means 24 are immediately sequenced after such lay down of the foil strip 18 it will be seen that, in effect, the lay down of the foil strip 18 and the immediately sequential welding of such strip 18 proceeds horizontally in a wave-like or a zipper-like motion.

FIG. 5 as well as FIG. 3 shows another feature of the machine 10. Since carriage beams 56 and 58 are relatively heavy, suitable air cylinders 95 that are electrically operated are connected between the carriage beam 56 and the main beam 60 and are controlled by the computer 28 to assist in lifting the carriage beam 56 during the fore-aft translation of the carriage beams 56 and 58. Similar air cylinders (not shown) are connected between the carriage beam 58 and the main beam 62.

Figure 6:
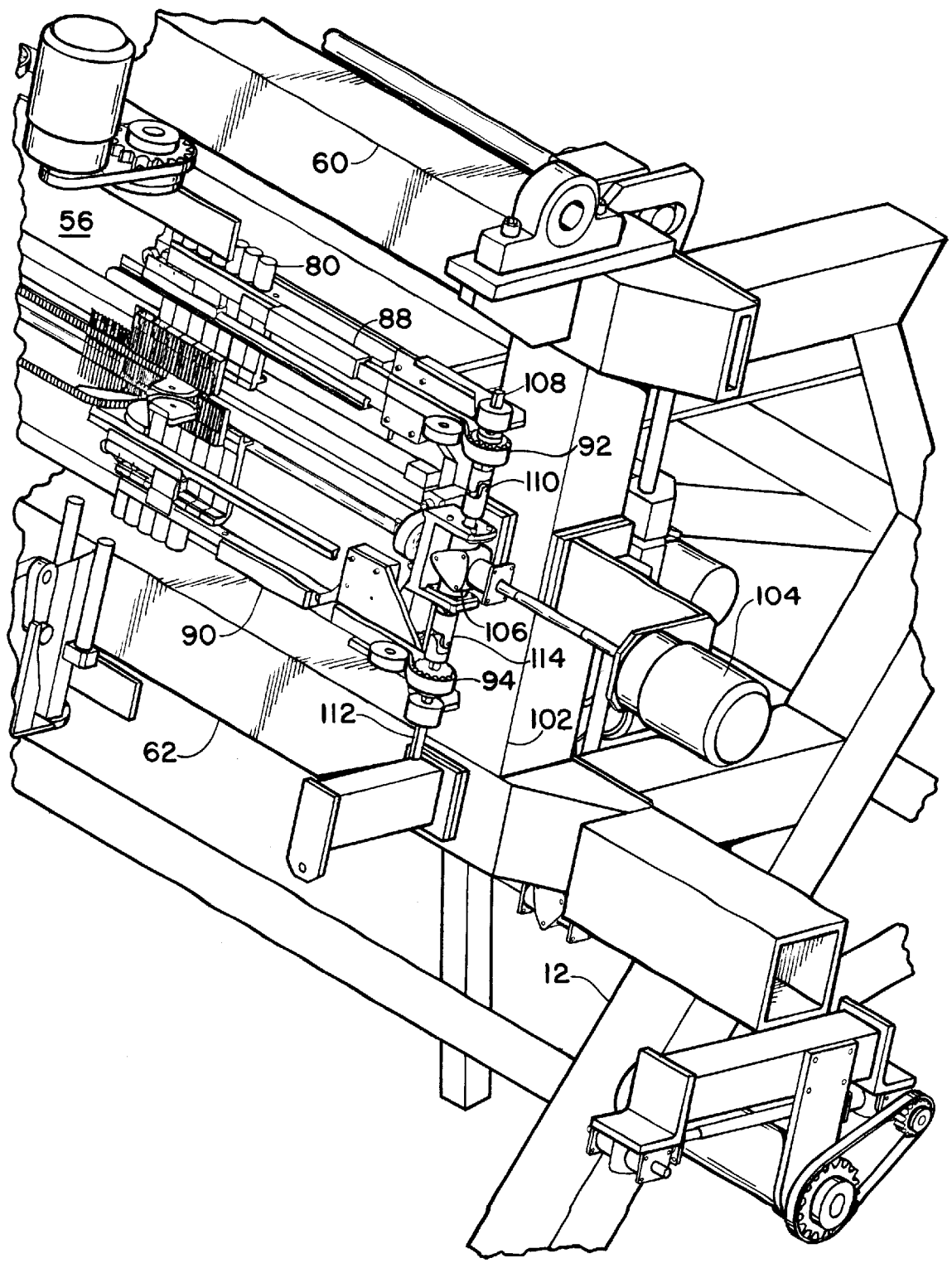
FIG. 6 is a simplified perspective of a portion of the machine of FIG. 1 that illustrates the drive means for the metal foil guide means and the metal foil receiving means.

FIG. 6 illustrates another aspect of the receiving means 22. It will be seen that the main frame 12 is provided with longitudinally extending spaced main beams 60 and 62 which are interconnected by vertical beams 100 and 102. It will be recalled, also, that an upper carriage beam 56 is operatively associated with the upper main beam 60 and that a lower carriage beam 58 is operatively associated with he lower main beam 62. A suitable reversible electric drive motor 104 is secured to beam 102 and is connected to a suitable gear box 106, also secured to beam 102. The gear box 106 drives an upper spline arm 108 that is provided with a suitable universal joint 110. The spline arm 108 drives the upper chain drive 92 that carries the upper biasing carriage 88 that provides the rotatable rollers 96 that upwardly urge individual weld blocks 64 during horizontal transit of such carriage 88.

Similarly, the gear box 106 drives a lower spline arm 112 that is provided with a suitable universal joint 114. The spline arm 112 drives the lower chain drive 94 that carries the lower spreader carriage 90 in vertical registration so that the lower individual guide blocks 66 are biased downwardly at the same time that corresponding upper weld guide blocks 64 are biased upwardly by horizontal transit of the upper spreader carriage 88.

The advantage of this particular drive arrangement for the upper and lower chain drives 92 and 94 will be appreciated when it is seen that the upper and lower carriage beams 56 and 58 are shuttled fore and aft to retract the weld pin electrodes of one bank of weld blocks from one row of cells of the portion of honeycomb core 16 that had been fabricated and then to advance that bank forwardly one-half cell pitch while at the same time the opposing bank of weld blocks and its weld pin electrodes shift the honeycomb core 16 aft one-half cell pitch. The spline shafts 108 and 112 act as conventional spline shafts to permit vertical translation of either the guide chain 92 or 94 upwardly as the carriage beam 56 or 58 is translated vertically for the required shuttling fore and aft of such carriage beams 56 and 58.

Referring now FIG. 7, another novel feature of the present invention will be described. The machine 10 is determinably adjustable to accommodate the fabrication of honeycomb core 16 having different vertical heights. For example, honeycomb core 16 is commonly fabricated for use in the aerospace industry having core cell sizes of ⅜" and 3/16". It is also desirable to be able to fabricate honeycomb core having any desired height for use in any application. A weld head frame 116 supports the welding means 24 and the foil strip guide means 18 and is hingedly connected to the main frame 12, as seen in FIG. 1 and 2. The weld frame 116 includes side beams 118 and 120 that are hingedly connected to rotatable portions 117 and 119 and also includes spaced longitudinally extending upper and lower beams 121 and 123.

The side beam 118 supports a suitable D.C. servo motor 124 that is operatively connected to a first threaded lead screw assembly 126 positioned on the left side of the frame 116 and to a second threaded lead screw assembly 128 positioned on the right side of the frame 116. Determinable actuation of the threaded lead screw assemblies 126 and 128 causes associated upper and lower chain drive guides 130 and 132 to be driven toward or away from each other. The upper chain drive guide 130 is associated with the upper guide surfaces of the fixed central guide means 34 and the upper guide surfaces of the translatable guide members 42, 44, 46 and 48. Similarly, the lower chain drive guide 132 is associated with the lower guide surfaces of the fixed central guide means 34 and the lower guide surfaces of the translatable guide members 42, 44, 46 and 48. Thus, selective actuation of the servo motor 124 enables the vertical foil receiving height of the aforesaid guide members to be set precisely for the receiving and guiding of a foil strip 18 having a precise height.

Figure 7:
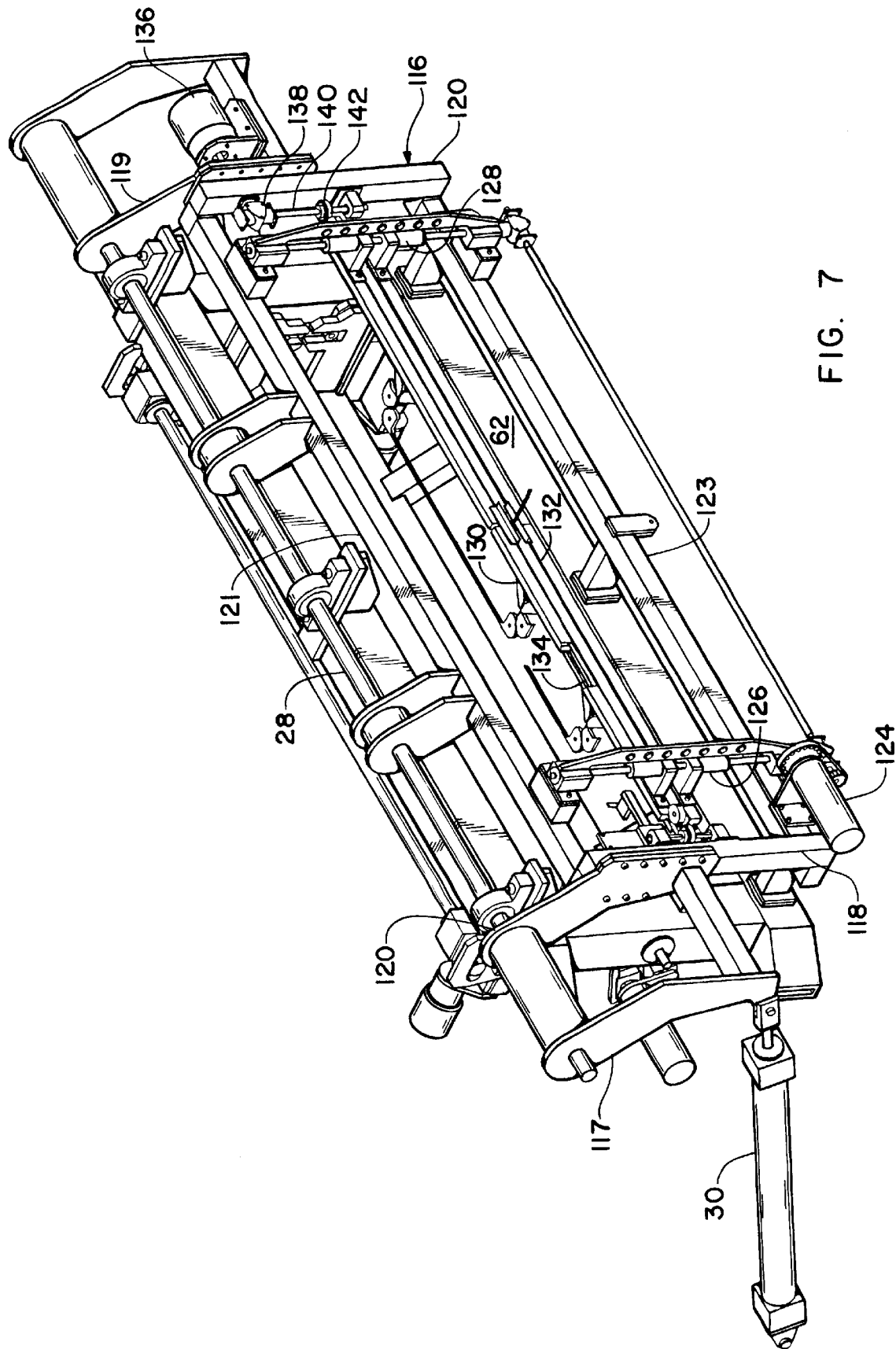
FIG. 7 is a simplified perspective of the weld head frame in its operative position and also illustrates the arrangement for adjusting the metal foil guide means to handle predetermined heights of metal foil.

FIG. 7 is also of interest for another purpose, especially when considered with FIG. 4. As seen in FIG. 5, the translatable guide members 42, 44, 46 and 48 are driven by the chain drive 134 seen in the cutaway of the upper chain drive guide 130. The D.C. servo motor 136 drives a gear box 138 that is drivingly connected to a suitable spline shaft 140 that is operatively connected at 142 to the drive chain 134. Thus, selective actuation of the servo motor 136 will drive the chain drive 134 in a preferred direction to drive the guide members 42, 44, 46 and 48 in a desired horizontal direction.

Figure 8:
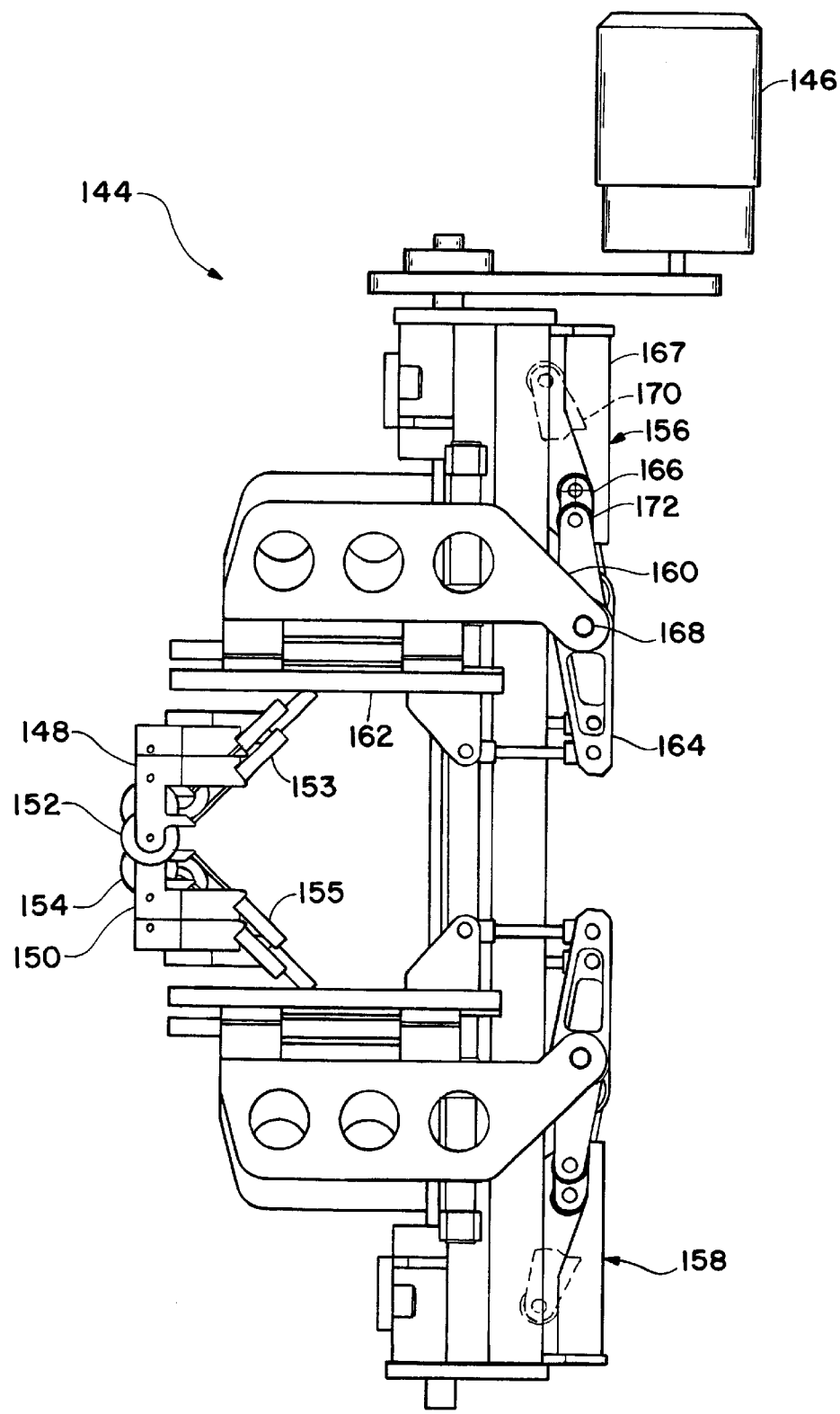
FIG. 8 is a side view of the welding means of the machine shown in FIG. 1 and illustrates different positions of the weld wheel electrodes.
Figure 9:
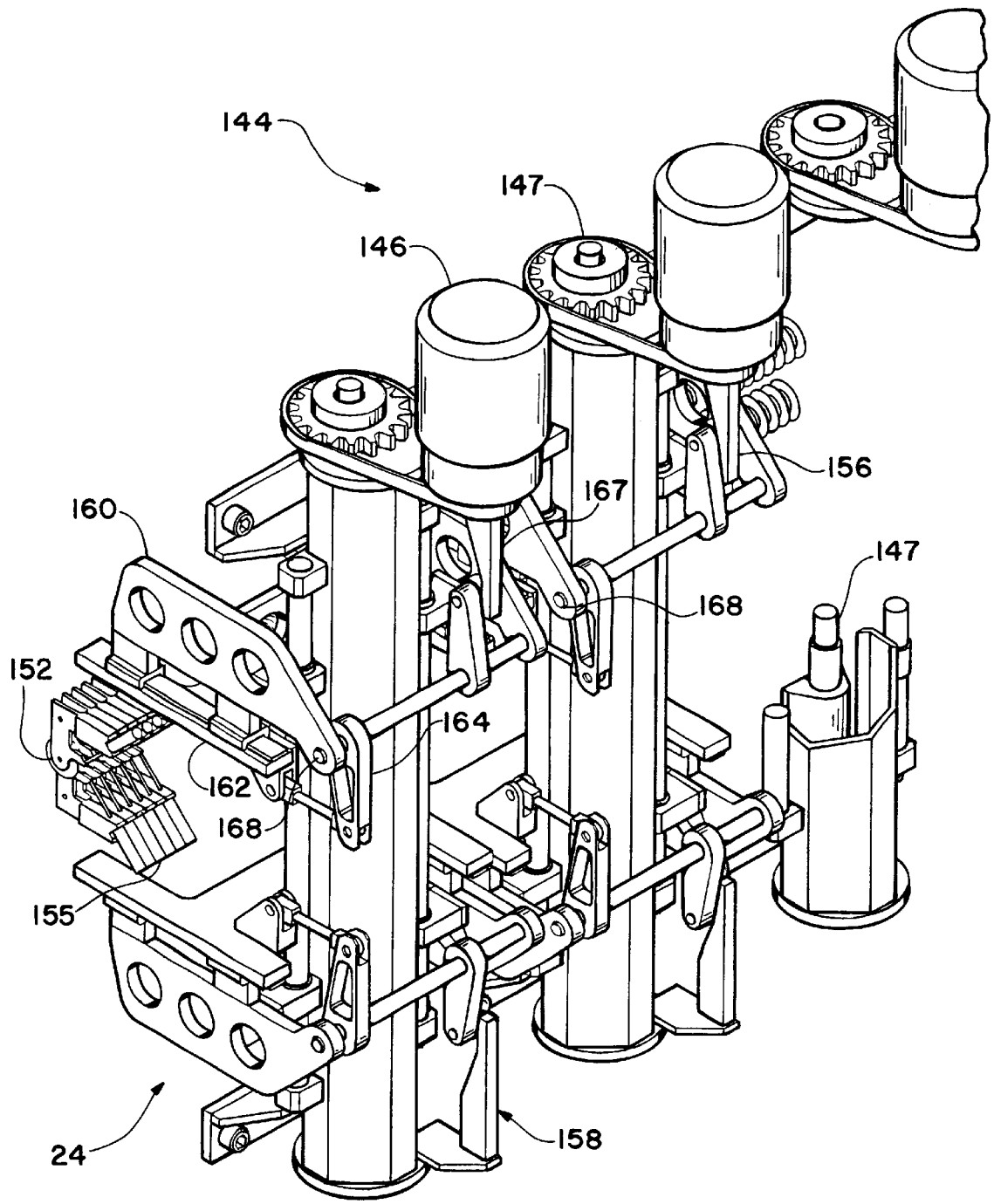
FIG. 9 is a perspective of the welding means shown in FIG. 8.

FIGS. 8 and 9 illustrate the welding means 24 in greater detail, especially when considered with FIGS. 4, 4A and 6. The machine 10 includes a plurality of weld stations 144, which in the illustrated embodiment, is five in number for a honeycomb core having a width of approximately 60 inches. Each weld station 144 includes a D. C. servo motor 146 which is selectively actuable to cause biased upper weld wheel assemblies 148 and biased lower weld wheel assemblies 150 to be translated vertically toward each other. As seen in FIG. 4, each weld wheel assembly 148 and 150 includes a set of spaced primary weld wheel electrodes 152 and 154 that upon translation are interleaved to provide welding contact with the foil strip nodes for welding contact therewith. Since the weld wheel electrodes 152 and 154 upon contact with the foil strip nodes are rotating in opposing directions the weld forces exerted on the abutting crests and troughs of each node are equalized. The physical pressure exerted on each node by the weld wheel electrodes 152 and 154 is individually adjusted by air pressure cylinders 153 and 155.

Upon selection of the D. C. servo motor 146 of one of the weld stations 144 for welding of the foil stip 18 nodes, a lead screw 147 of the weld station 144 is actuated to drive the opposing upper and lower weld wheel electrodes 148 and 150 toward each other, as seen in FIG. 8. A suitable cam follower arrangement 156 for the upper weld wheel set 148 and a similar cam follower arrangement 158 for the lower weld wheel set 150 cause the associated weld wheel sets 152 and 154 to be driven inwardly for welding contact with the foil strip 18 node.

The cam follower arrangement 156 for the upper weld wheel set 148 will be described with the understanding that the lower cam follower arrangement 158 is the same. The cam follower arrangement 156 includes a biased arm arrangement 160 which is operatively secured to the lead screw 147 for vertical translation. At its lower surface the biased arm arrangement 160 is provided with a slide member 162 which is horizontally translatable and that has a upper weld wheel set 148 secured to one end and biased cam follower 164 and cam follower wheel 166 secured to the opposing end. A suitable cam 167 is vertically positioned for contact with the biased arm 164 and roller 166. The biased arm 164 is pivoted at 168 to the arm arrangement 160.

It will be seen that when the roller 166 is in the "at rest" position indicated by the dotted outline 170 and the lead screw 147 commences to rotate, the biased arm arrangement 160 will be translated vertically downwardly and as the roller 166 starts down the sloping portion of the cam 168 the biased cam follower arm 164 with be rotated inwardly and cause the slide member 162 and attached weld wheel set to be translated inwardly. When the roller 166 reaches the end of the downward slope of the cam 168 the weld wheels 152 come into contact with the foil strip 18 for resistance welding thereof. A suitable electrical resistance welding circuit (not shown) provides pulsed electrical power for the resistance welding of the abutting crests and troughs of the first and second portions of the foils strip 18. This electrical resistance welding continues until the roller 166 reaches its lowest position as indicated by reference character 172, which when taken with reference to the position indicated at 166 represents a vertical distance representative of the depth or height of the honeycomb core 16. Thereupon the welding ceases and the lead screw 147 rotates in a contrary direction to return the weld wheel heads 152 to their at rest position 170 as the roller 166 of the cam follower 169 follows the cam 168. Obviously, the welding may take place on either the downward or upward travel of the weld wheels 152 across the node of the foil strip 18.

While the disclosed preferred embodiment of the machine 10 discloses a welding means 24 that provides an electrical resistance welding arrangement in which a secondary weld pin electrode is inserted in a cell of the honeycomb core 16 for resistance welding of an abutting crest and trough of the metal foil strip 18 by a primary weld wheel electrode, it would also be with in the scope of this invention for the welding means 24 to provide a suitable laser welding arrangement for welding together the abutting crests and nodes of portions of the metal foil strip. In such instance, the upper and lower weld pin electrodes 68 and 70 would continue to be inserted into the cells of the metal foil strip 18 as it is positioned for welding but in this such weld pin electrodes would be used only for support of the cell walls and to assist in the horizontal positioning of abutting crests and troughs of the metal foil strip and would not act as secondary welding electrodes since the welding process would be accomplished solely by the laser welder.

Turning now to FIGS. 10–12, the sequence of welding horizontal portions of the metal foil strip 18 together and shuttling the honeycomb core 16 gradually aft onto the table 14 as the core 16 is fabricated will be described in greater detail. In FIG. 10, by way of example, the upper weld pin electrodes 68 are shown as being inserted in the aft row of cells of honeycomb core 16 then being fabricated and the lower weld pin electrodes 70 are shown as being inserted in a forward row of cells of such honeycomb core 16. A layer of the deformed metal foil strip 18 is shown as being laid against the forward row of weld pin electrodes 70 so that the crests and troughs of the foil strip 18 are in horizontal registry with the layer of foil 18 that had been previously laid down and welded in place. The weld wheel electrodes 152 and 154 are then actuated into welding contact with the nodes provided by the abutting crests and troughs of the two portions of the foil strip 18.

After the welding procedure is completed for one complete width of the honeycomb core 16, the weld pin electrodes 68 are vertically translated to clear the cells of the honeycomb core 16 and upon such clearance the weld pin electrodes 68 are advanced forwardly one-half cell pitch and vertically translated in the opposing direction to be positioned to receive another layer of metal foil strip 18. As seen in FIGS. 10–12, the cross-shaped cross section of each weld pin electrode provides four outwardly extending arms that act to position the lay down of another portion of the metal foil strip 18 to assure precise longitudinal registration of the opposing crests and troughs of one layer of the foil strip 18 with the troughs and crests of a preceding layer. As the weld pin electrodes are advanced forwardly one-half cell pitch for the receipt of another layer of the metal foil strip 18, the weld pin electrodes 70 are shuttled or translated rearwardly and by such action to shuttle that portion of the honeycomb core 16 that had been previously fabricated aft on the table 14, as seen in FIG. 11.

Similarly, when the weld wheel electrodes 152 and 154 have again vertically traversed the nodes of the abutting crests and troughs of two layers of the metal foil 18 to weld such layers together, the weld pin electrodes 70 are vertically translated to clear the honeycomb layer 16 whereupon the weld pin electrodes 70 are shuttled forwardly for an opposing vertical translation as the weld pin electrodes 68 are shuttled aft one-half cell pitch for sequential lay down of another layer of metal foil 18 and the following welding of such foil layer by a set of upper and lower primary weld wheel electrodes.

It will be seen in FIG. 12, which corresponds to FIG. 11, how the weld pin electrodes 68 are positioned in a weld block 148 while an opposing set of weld pin electrodes are positioned in a weld block 150. It should be noted that each of the weld blocks 148 and 150 are provided with spaced longitudinally extending grooves 160 and 162 for receiving the vertically translating weld wheel electrodes for travel to and welding contact with nodes of the weld strip 18. Vertically extending spaced relieved portions 164 and 166 are preferably provided between the grooves 160 and 162 to promote heat transfer occasioned by the welding process. Preferably, the weld blocks 148 and 150 as well as the weld electrodes 68 and 70 are composed of a suitable copper alloy. It will be further appreciated that the weld blocks 148 and 150 are modular so that such blocks and attached weld pin electrodes may be easily maintained by replacement of individual blocks for maintenance purposes or by replacement of entire banks of such weld blocks and weld pin electrodes for changing the size of the honeycomb core 16 to be fabricated by the machine 10.

Figure 14:
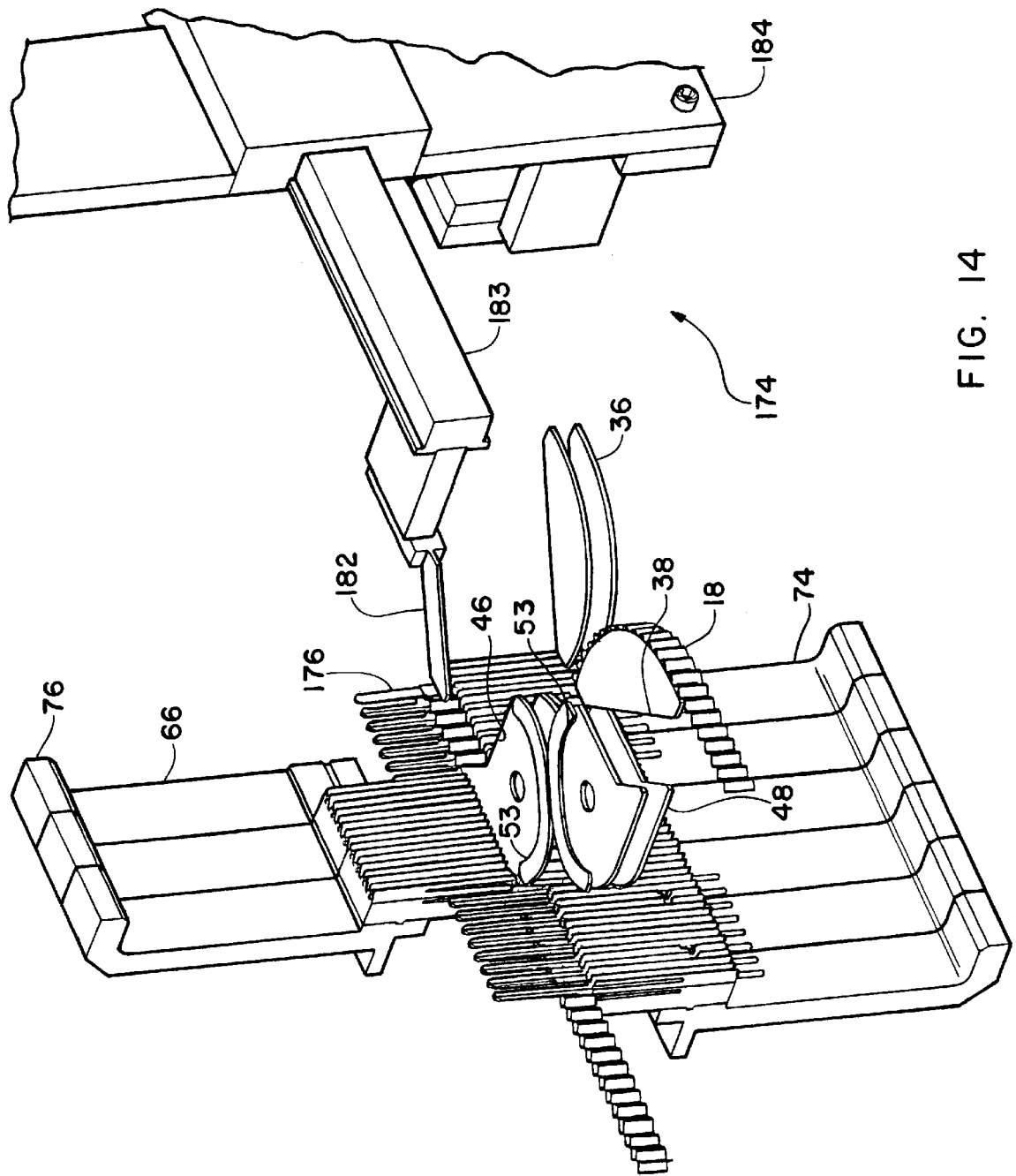
FIG. 14 is a detail perspective of a metal foil turnaround mechanism of FIG. 13 to illustrate its operation at one end of the honeycomb core.

Referring now to FIGS. 12 and 14, another novel feature of the machine 10 will be described. When a complete horizonal layer of the metal foil strip 18 has been positioned against a previous portion of such metal foil strip 18 and has been sequentially welded thereto in a wave motion provided by the machine 10, it is necessary to reverse the horizonal direction of the traverse of the foil strip guide means 20 and to re-establish such lay down and welding process immediately in the opposing direction. This objective is accomplished by rotating the foil strip guide paddles 46 and 48 to commence to lay down the foil strip 18 in the opposing direction. However, just prior to the reversal of the guide paddles 46 and 48 a pin assembly 174 is operative to crimp or bend the foil strip 18 around a steel pin 176 positioned in a endmost lower weld block 150 at it outermost end. Following such crimping or bending by the pin assembly 174 the foil strip 18 is laid against the previously welded portion of the honeycomb core 16 as described previously hereinabove.

Figure 13:
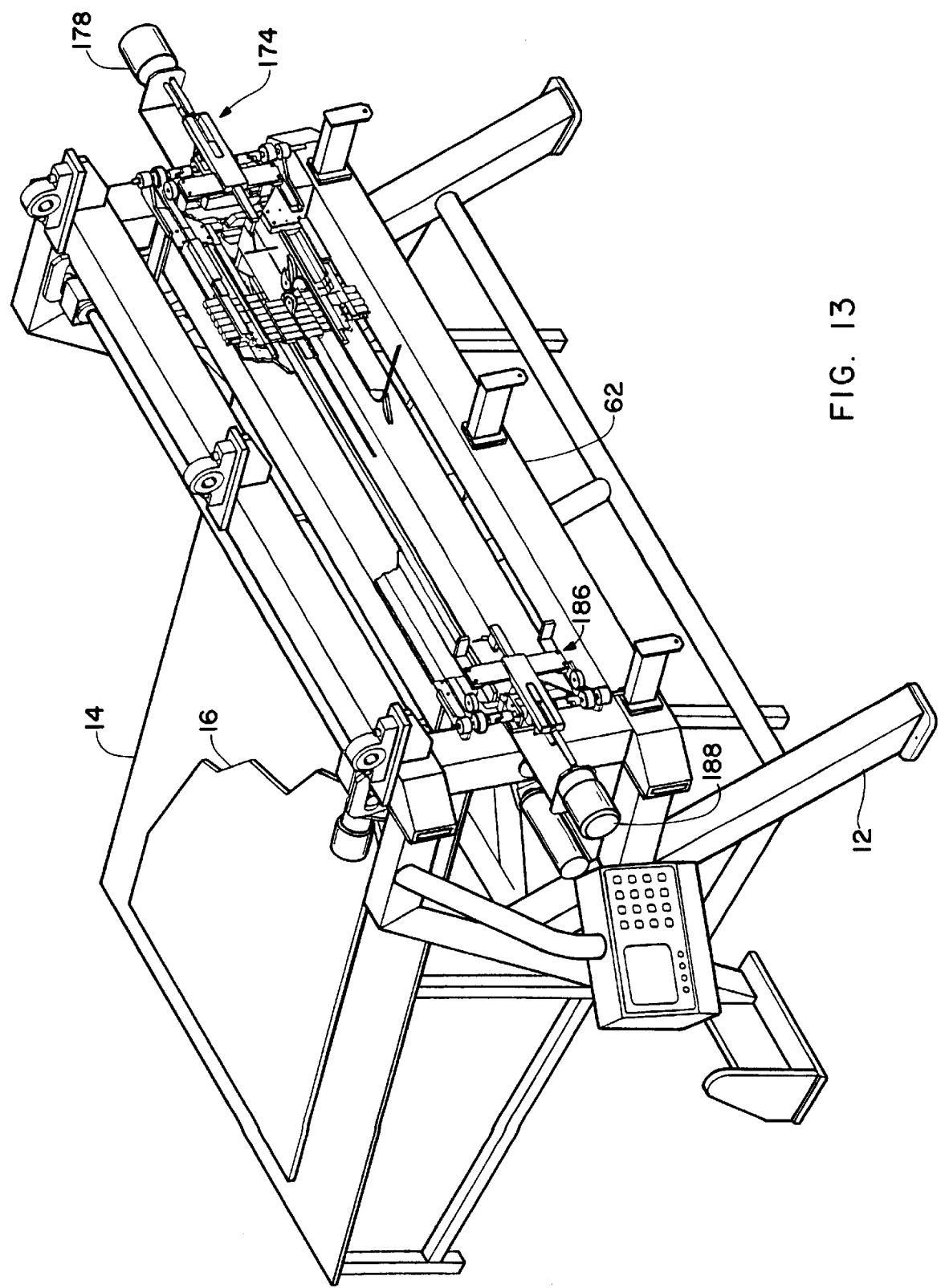
FIG. 13 is a simplified perspective of the machine of FIG. 1 with portions removed for the purpose of clearly illustrating the metal foil turnaround mechanism when the foil has reached the finite width of the honeycomb core being fabricated.

As seen in FIGS. 13 and 14, the right hand pin assembly 174 is secured to the main frame 12 and includes a suitable D. C. servo motor 178 that retractably drives a slider 180 to which is affixed a finger member 182 which crimps or bends the metal foil strip 18 around the steel pin member 176. Following actuation of the finger member 182 into bending contact with the foil strip 18, the member 183 to which finger member 182 is attached, is withdrawn into assembly 184, also secured to the main frame 12, until the welding cycle is to be repeated following another traverse of the foil strip 18 to the right front side of the machine 10.

In FIG. 14, which is seen to have many elements omitted for ease of illustration of the foil bending aspect of the invention, it will be seen that a similar foil bending assembly 186 is provided at the left front of the machine 10 for bending the metal foil 18 at the opposing end of its horizontal travel. The pin assembly 186 is secured to the main frame 12 and is driven by a D.C. servo motor 188 that is secured also to the main frame 12. In the preferred embodiment of the invention 10 the left hand pin assembly 186 is releasably secured to the main frame 12 in a manner that its at rest position may be shifted horizontally with respect to the main frame 12 in order to accommodate the fabrication of core blankets 16 of various desired widths.

Figure 15:
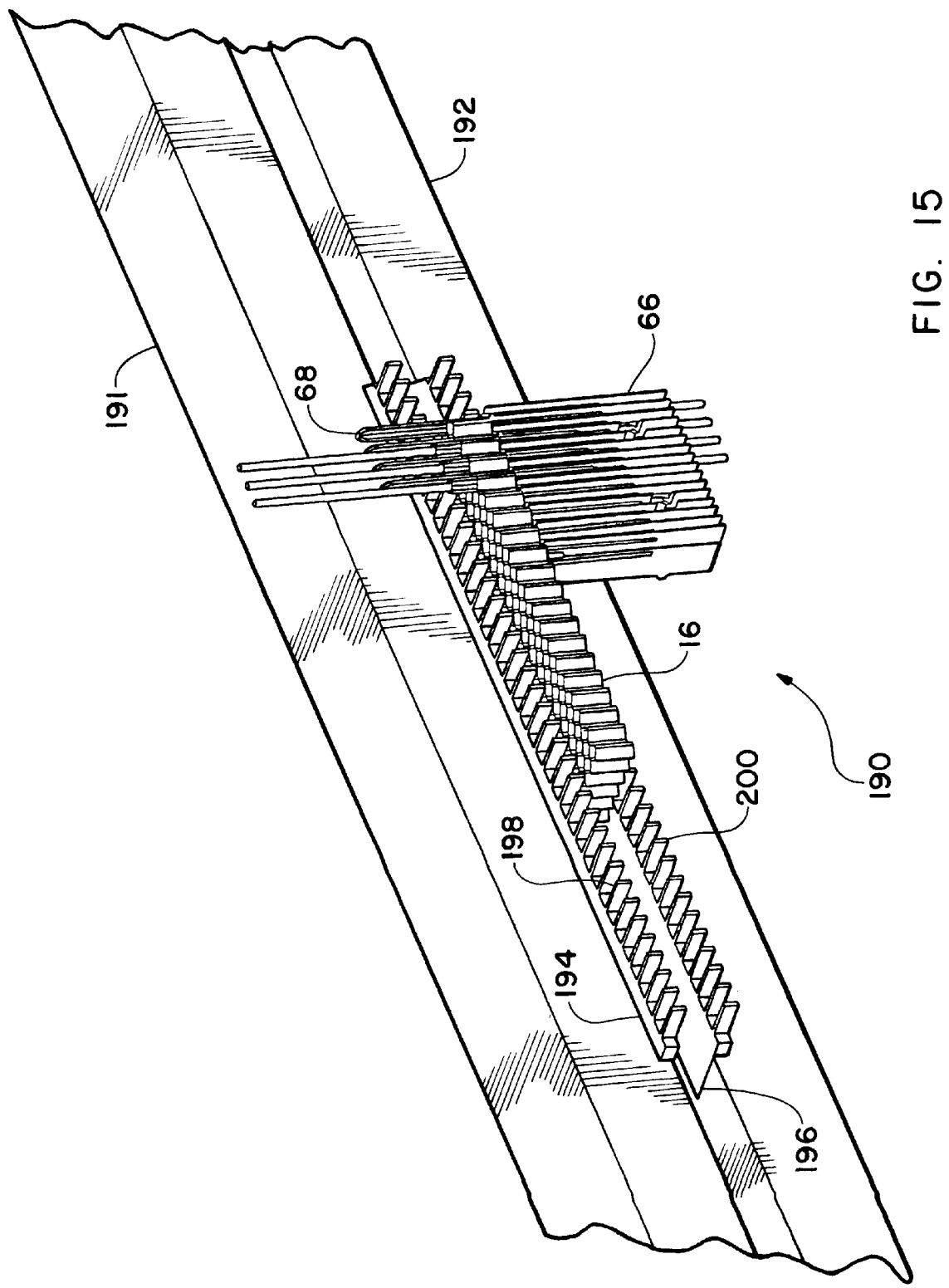
FIG. 15 is a detail perspective to illustrate the cooperation between the upper and lower retainer bars and the weld pin electrodes during fabrication of the honeycomb core.
Figure 16:
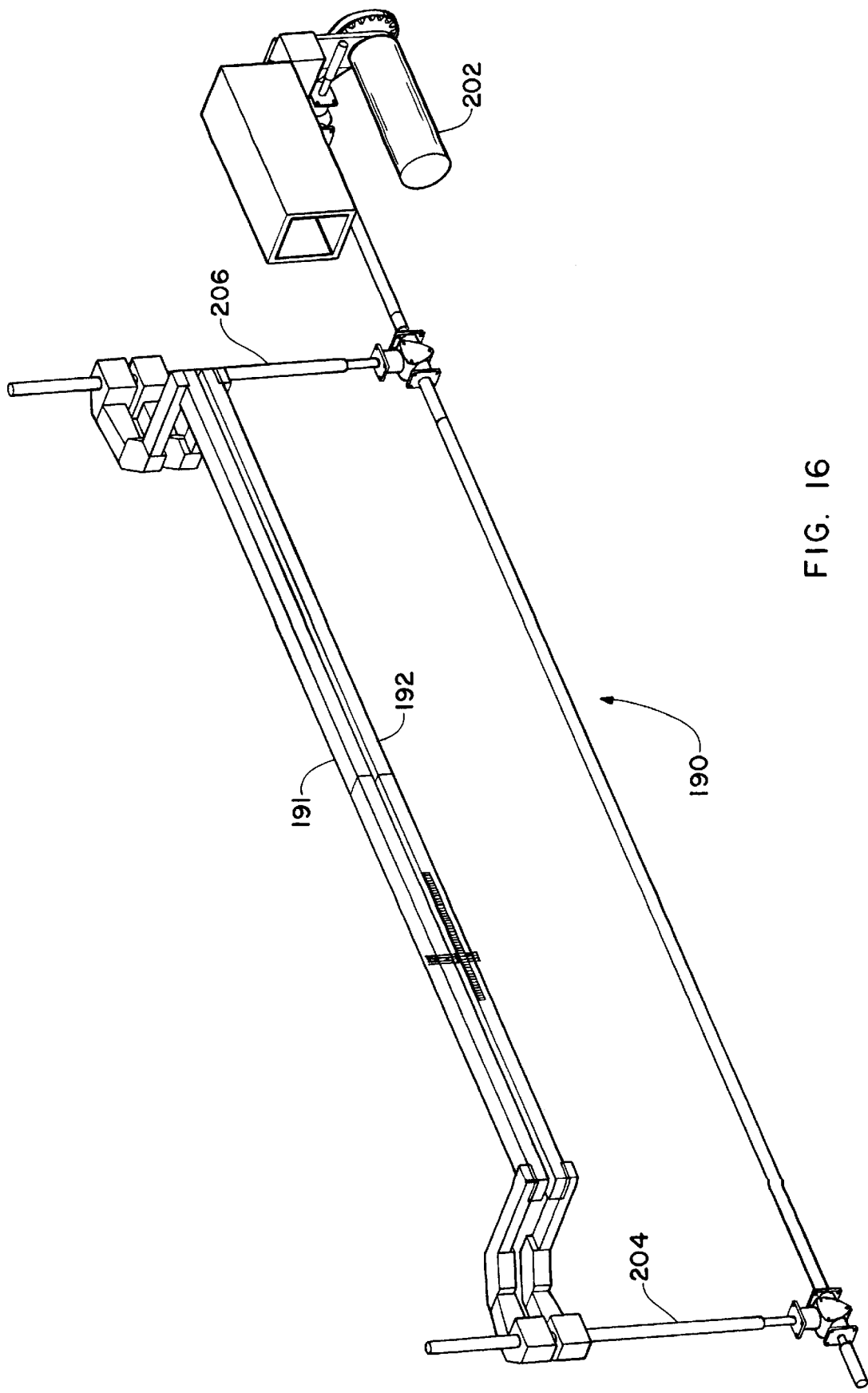
FIG. 16 is a simplified perspective of the retainer bar arrangement and the provision for its vertical adjustment.

Referring now to FIGS. 15 and 16, which show a retainer bar assembly 190 to ensure that a forward portion of the honeycomb core 16 will not be translated vertically when a bank of weld blocks and weld pin electrodes are translated vertically due to the close cooperation of each weld pin electrode and the interior of the cell of the honeycomb core when such weld pin electrode is extracted therefrom. The retainer bar assembly 190 includes a pair of spaced spreader bar members 191 and 192 which are positioned at the rear of the machine 10 and extend forwardly toward the front edge of the honeycomb core 16 being fabricated. The retainer bar members 190 and 192 are each provided at their leading inner edge with attached members 194 and 196 respectively. The member 194 is provided with spaced forward extending finger members 198 and the member 196 is provided with similar finger members 200. The finger members 198 and 200 spaced sufficiently apart to be allowed to extend forwardly between the weld pin electrodes 68 and 70 so that upon vertical translation of the one bank of the weld blocks with the associated weld pin electrodes the members 194 and 196 with their associated comb members 198 and 200 which at that time are in opposing vertical contact with opposing faces of the honeycomb core 16 will restrain the forward portion of the core 16 against any possible vertical translation.

A suitable D.C. servo motor 202 drives a first lead screw 204 and a second lead screw 206 to precisely set the vertical distance separating the spreader bars 190 and 192 whereby such spreader bar members 190 and 192 may be set to what may be considered "grazing contact" with the honeycomb core 16 being fabricated whereby the honeycomb core 16 may be precluded from vertical translation while yet permitting aft translation of the honeycomb core 16 as it is being fabricated without binding the core 16 during its aft transit.

Referring now to FIGS. 17–23, the mechanism 202 to shuttle the upper and lower banks of weld pin electrodes 68 and 70 fore and aft will be described in detail. It will be recalled that following the welding of one complete horizontal portion of the foil strip 18 to another complete horizontal portion of the foil strip 18 to provide a portion of the honeycomb core 16 having the desired width it is necessary to initially withdraw one bank of weld pin electrodes, translate simultaneously fore and aft the upper and lower banks of weld pin electrodes whereby the then fabricated portion of the honeycomb core 16 is translated aft, and thereafter vertically translate in an opposing direction the bank of weld pin electrodes that had been previously extracted from the core so that now such bank of weld pin electrodes contact sides of the open cells of the forward face of the honeycomb core 16 for the sequential lay down of the foil strip 18 and the welding of such following such lay down. The mechanism 202 includes upper horizontally spaced guide members 204 and 206 that are secured to the upper carriage beam 56. Similarly, the mechanism 202 includes lower horizontally spaced guide members 208 and 210 that are secured to the lower carriage beam 58.

Figures 17, 18:
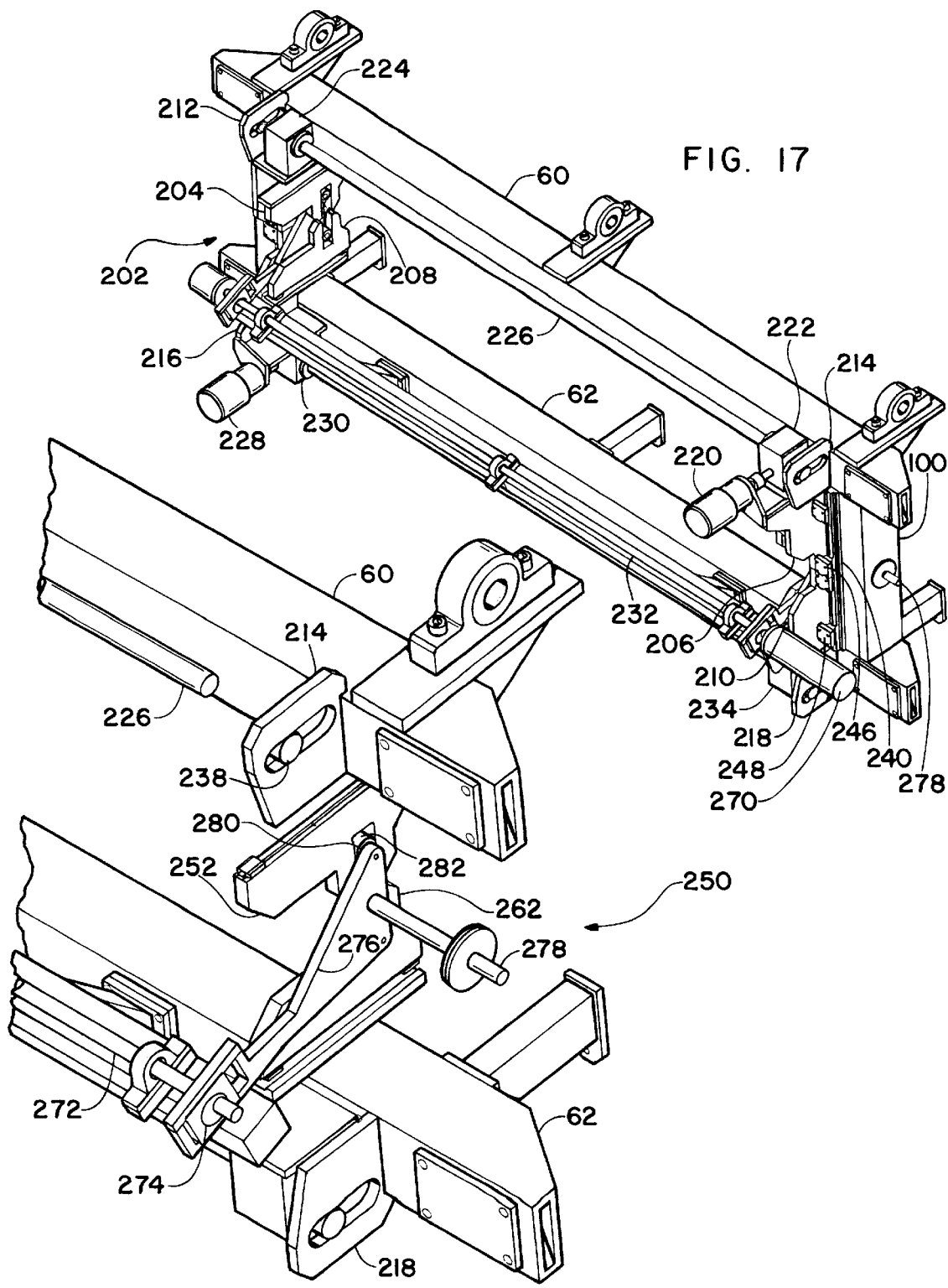
FIG. 17 is a simplified perspective of the rocker arm drive assembly to advance forward and aft rows of the weld pin electrodes.
FIG. 18 is a detail perspective of a cam arrangement for providing the fore and aft movement of the carriage beams provided by the rocker arm drive assembly.
Figure 19:
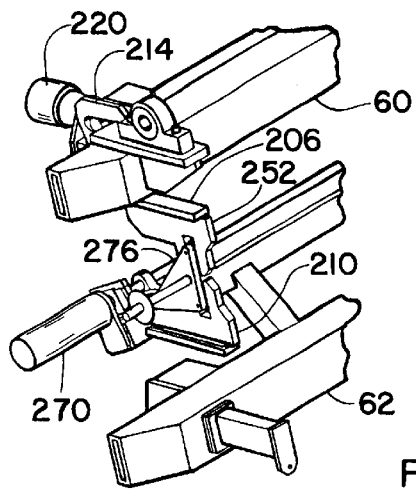
FIG. 19 is a detail perspective of another perspective of the rocker arm drive assembly seen in FIG. 17.
Figure 20:
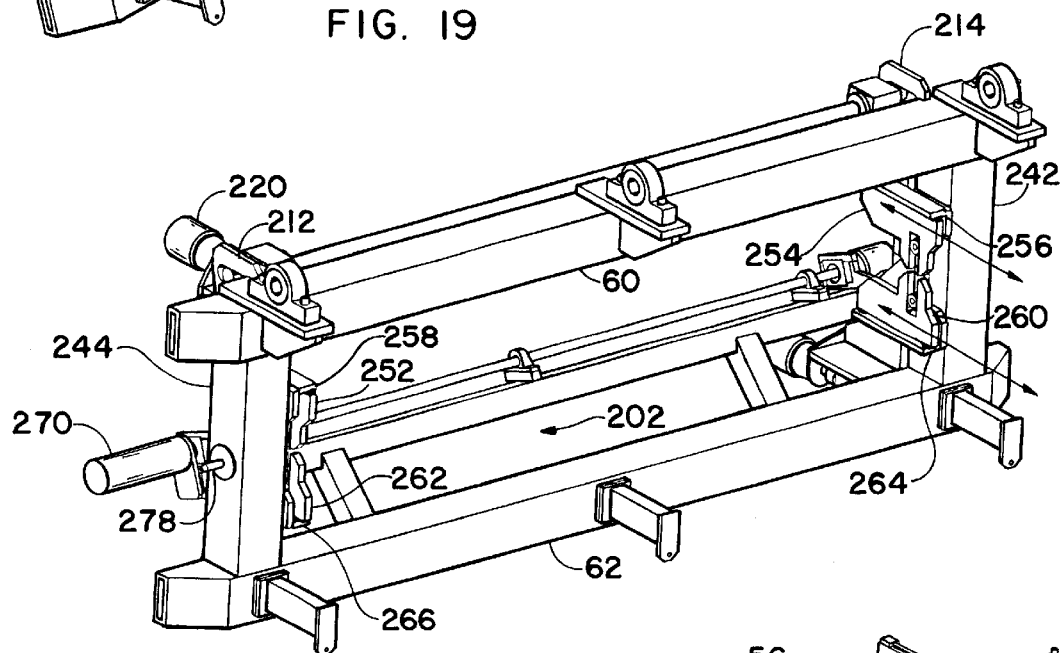
FIG. 20 is a simplified perspective of the rocker arm drive assembly to illustrate more clearly the drive motors for the vertical and horizontal movement provided by the rocker arm drive assembly.
Figure 23:
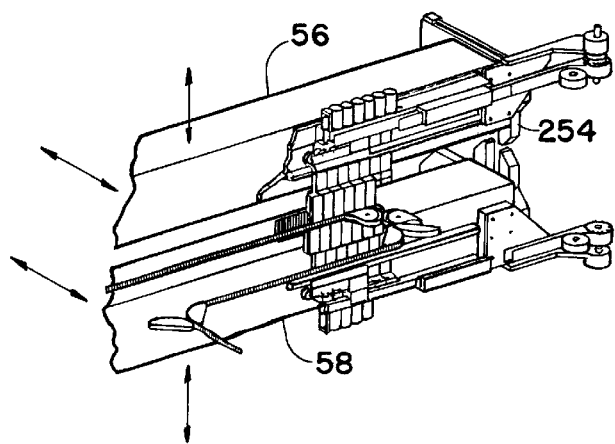
FIG. 23 is a simplified perspective to illustrate the vertical and horizontal translation of the carriage beams provided by the rocker arm drive assembly.
Figure 21:
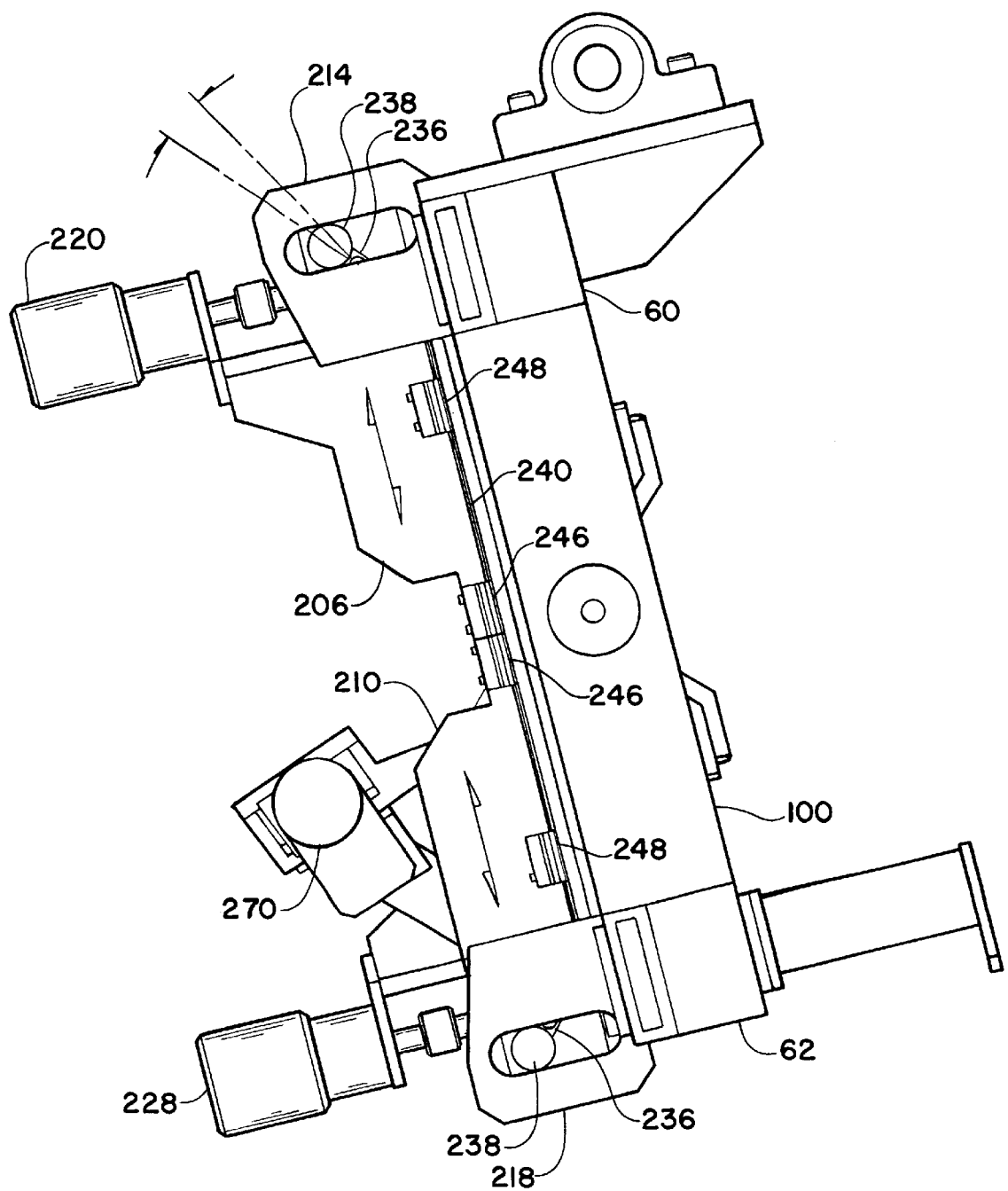
FIG. 21 is a side view of the rocker arm drive assembly of FIG. 20.

The upper guide members 204 and 206 are operatively associated with the upper main beam 60 while the lower guide members 208 and 210 are operatively associated with the lower main beam 62 of the main frame 12. Referring specifically to FIGS. 17, 20 and 21 it will be seen that spaced upper cam members 212 and 214 are fixed to each end portion of the upper main beam 60 while similarly spaced lower cam members 216 and 218 are fixed to each end portion of the lower main beam 62. A suitable upper reversible D.C. servo motor 220 drives a first gear box 222 that is in turn coupled to a second gear box 224 through a shaft 226. Similarly, a lower reversible D.C. servo motor 228 is coupled to a first gear box 230 that is coupled through a shaft 232 to a second gear box 234. As seen in FIG. 21, each of the upper and lower sets of gear boxes 222, 224, 230 and 234 is provided with a bell crank arm 236 having a roller cam follower 238 disposed at its outer end. The operation of only one bell crank arm 236 and roller cam follower 238 will be described for brevity of description. Upon selective actuation of the servo motors 220 and 228, the bell cranks 236 driven by the gear boxes 222, 224, 230 and 234 are rotated in predetermined rotary directions. Since each roller 238 rotatably attached to each bell crank arm 236, is constrained against vertical movement by each fixed cam secured to a main beam 60 or 62, rotation of each bell crank arm 236 will result in the gear boxes 222, 224, 230 and 234 being driven vertically in a desired direction.

As seen in FIGS. 17 and 21, the upper guide members 204 and 206 and the lower guide members 208 and 210 to which the aforesaid gear boxes are secured are constrained to slide vertically a predetermined distance on guide tracks 240 on spaced vertical side frames 100 and 102 that interconnect the main beam members 60 and 62. Each guide member 204, 206, 208 and 210 is provided with fixed slider members 246 and 248 that are slidably disposed on each track member 240 for vertical translation of the upper guide members 204 and 206 secured to upper carriage beam 56 and vertical translation of the lower guide members 208 and 210 secured to the lower carriage beam 58. Thus, selective actuation of either the servo motor 220 or the servo motor 228 will result in precise vertical translation of either the upper carriage beam 56 or the lower carriage beam 58 to retract the attached weld pin electrodes from the honeycomb core 16 to enable the sequential shuttling of such carriage beams 56 and 58 to proceed.

The shuttling of such carriage beams 56 and 58 fore and aft is provided by a shuttle mechanism 250 as illustrated in FIGS. 17–23. The shuttle mechanism 250 includes two spaced upper guide members 252 and 254 that are fixedly secured to the upper carriage beam 56. The guide members are 252 and 254 are slidably disposed on spaced horizontal track members 256 and 258 that are secured on upper guide members 204 and 206 that are subject to vertical translation as previously described. Similarly, lower guide members 260 and 262 are fixedly secured to the lower carriage beam 58. The lower guide members 260 are slidably disposed on spaced horizontal track members 264 and 266 that are secured on lower guide members 208 and 210 respectively.

Figure 22:
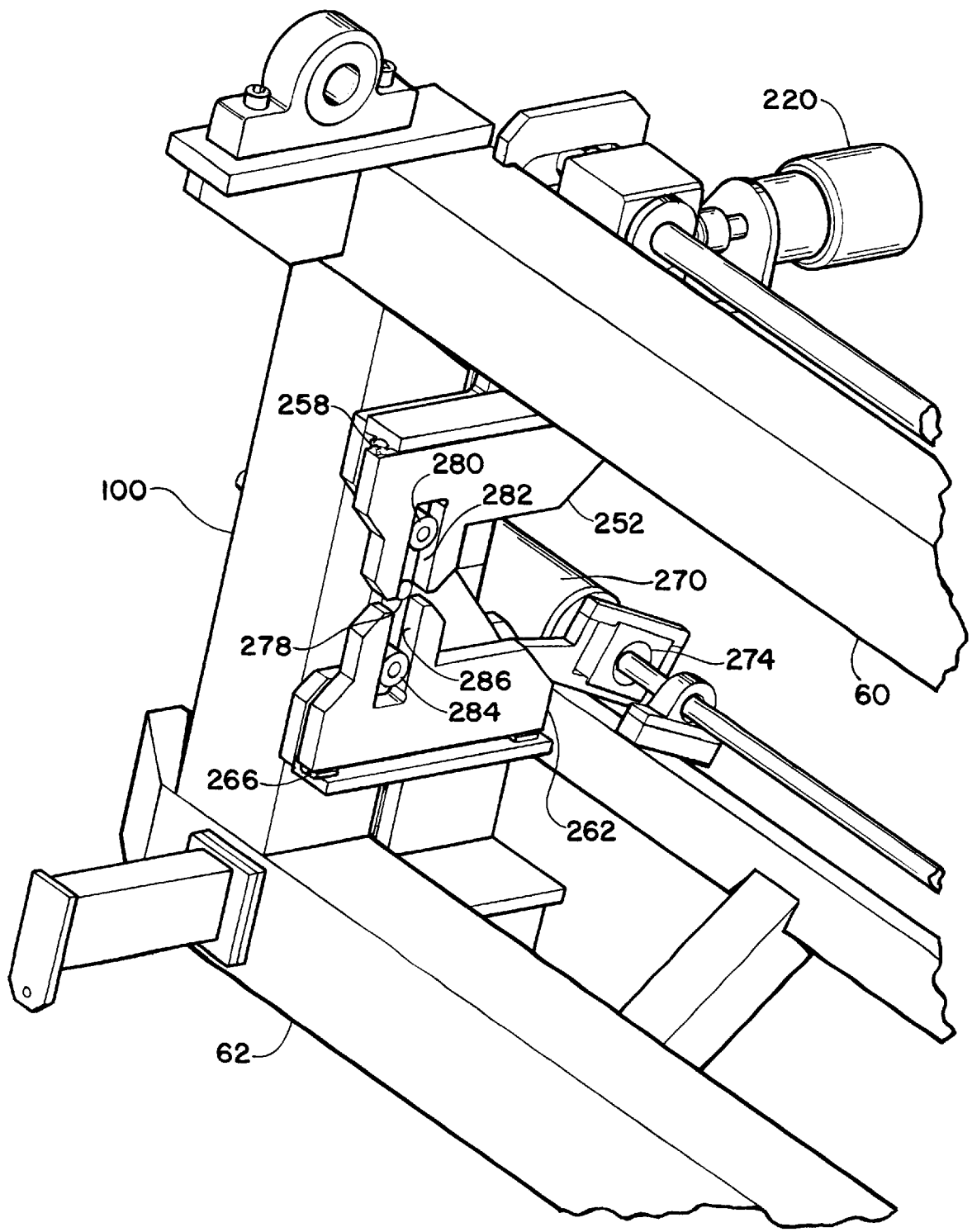
FIG. 22 is a detail perspective of a portion of the rocker arm drive assembly of FIG. 20.

For brevity purposes, the specific mechanism for horizontally shuttling the upper guide members 252 and 254 and lower guide members 260 and 262 fore and aft will be described only for guide members 252 and 262 as exemplary of the other guide members 254 and 260. Referring first to FIGS. 18 and 22, it is seen that a suitable D.C. servo motor 270 reversibly drives a shaft 272 to which an eccentric cam member 274 is secured. Rotation of the shaft 272 rotates the eccentric cam member 274 which in turn causes an associated cam member 276 that is fixedly secured to a pivot shaft 278 to rotate in a predetermined direction about the pivot shaft 278 to a very limited degree. Rotation of the cam member 276 about the shaft 278 causes an upper roller 280 rotatably disposed on the cam member 276, and positioned within a vertical slot 282 of the upper guide member 252, to slide the upper guide member 252 forwardly or aft on the upper guide track 256 and thereby cause the upper carriage beam 56 to be translated fore or aft in accordance with the direction of rotation of the eccentric cam 214 as driven by the servo-motor 270.

At the same time the cam member 276 is rotated about the pivot shaft 278 in either a clockwise or counter-clockwise direction, the cam member causes a lower roller 284 carried on the cam member 276 below the roller 280 and disposed in a vertical slot 286 in guide member 262 to slide the lower guide member 262 on guide track 266 in a direction opposite to that of the guide member 262. Thus, selective directional rotation of the eccentric cam 274 causes the guide members 252 and 262 and associated carriage beams 56 and 58 to shuttle the banks of upper weld pin electrodes and lower weld pin electrodes fore and aft.

The foregoing has illustrated how the present invention provides an automatic machine for rapidly fabricating a continuous length of metallic honeycomb core having a determinable width and precise height and being suitable for use in bonding in a honeycomb core panel structure substantially as fabricated from a continuous strip of preformed preferably corrugated metal foil having spaced crest and trough sections. The novel machine provides for laying down the metal foil strip in a manner such that a succeeding layer of such foil is positioned in precise vertical registry and precise horizontal registry to provide nodes of abutting crests and troughs of such foil and as such lay down proceeds across the width of the honeycomb core being fabricated the welding of such abutting nodes sequentially proceeds thereafter in a continuous "wave" like motion. The weld blocks and associated weld pin electrodes and the weld wheel electrodes are modular in nature and enhance the serviceability of the machine as well as reduce the time required to reconfigure the machine to fabricate metallic honeycomb core having various heights and cell sizes. The welding section and the foil guiding section of the machine are hingedly attached to a main frame to provide easy access to the operative components of the machine.

The present disclosure discloses that contained in the appended claims as well as that of the foregoing description. Although this invention has been described in its preferred form with a certain degree of particularity, it is understood that the present disclosure of the preferred form has been made only by way of example and numerous changes in the details of construction and combination and arrangement of parts and method steps may be resorted to with out departing from the spirit and scope of the invention. For example, while a particular electric resistance welding arrangement has been disclosed for the welding of the abutting nodes of the metallic foil strip it is within the scope of the present invention to provide an equivalent laser welding arrangement to weld together such abutting nodes as the metallic foil strip is positioned in vertical and horizontal registry.

What is claimed is:

1. A machine for rapidly fabricating a continuous length of metallic honeycomb core having a determinable width and precise height, and being suitable for use in bonding in a honeycomb core panel structure substantially as fabricated, from a continuous strip of preformed metal foil having spaced crest and trough sections, said machine comprising:

guiding means to continuously direct a continuous preformed metal foil strip having spaced crest and trough sections at a determinable speed for a predetermined length in a reversible predetermined direction for the welding of such foil strip into a metallic honeycomb core;

means responsive to said guiding means to receive first and second serial portions of said metal foil and to position them for contacting registry of crests of said first portion with troughs of said second portion and in precise vertical registry;

welding means to weld together said contacting crests and troughs of predetermined horizontal portions of said first and second portions of said continuous foil strip as they are brought into horizontal and vertical registry; and means to advance rearwardly said welded portion of said honeycomb core in a direction normal to the front planar surface of said welded portion whereby said guiding means may reverse the direction of directing said continuous foil strip to permit the continuous welding together of further portions of said continuous foil strip into a unitary honeycomb core having a predetermined width and a precise height.

2. The machine of claim 1 wherein the guiding means comprises a central fixed guide portion and a horizontally translatable guide portion, said translatable portion being reversibly horizontally translatable at a predetermined speed to position foil strip in a predetermined location.

3. The machine of claim 2 wherein translatable guide portion has sections that are determinably rotatable to reverse the direction in which the foil strip is positioned.

4. The machine of claim 3 wherein said receiving means includes upper and lower banks of horizontally arranged weld blocks that are biased into contact with said first and second portions of the foil strip to maintain said first and second portions of said foil strip in vertical registry.

5. The machine of claim 4 wherein said guide means further includes means to urge opposing individual weld blocks of such banks of weld blocks vertically away from a foil strip contacting position to permit the guide means to position a portion of the foil strip against a preceding portion of such foil strip for a contacting welding position.

6. The machine of claim 5 wherein said weld blocks include flange means, and horizontally translatable rotatable means associated with the guide means cooperate with said flange means to urge opposing individual weld blocks in said vertical directions to permit positioning of a portion of said foil strip against a previously positioned portion of said foil strip as the translatable guide portion translates horizontally.

7. The machine of claim 6 wherein each of said weld blocks includes a plurality of vertically extending pin weld electrodes, each said weld pin electrode being insertable in a cell formed by the horizontal registry of crest and troughs of first and second portions of the foil strip to provide support for the walls of each cell during welding together of first and second portions of said metallic foil by the welding together of said abutting crests and troughs.

8. The machine of claim 7 wherein the vertically extending portion of each pin weld electrode is cross shaped having radially extending arms of equal length and is positioned within a cell so that the outer face of one arm contacts an inner portion of an abutting crest and trough portion of two horizontally aligned portions of said foil strip.

9. The machine of claim 8 wherein the vertically extending pin weld electrodes are arranged in horizontally extending rows arranged parallel to the direction of the position of the foil strip.

10. The machine of claim 9 wherein each vertically extending pin weld electrode is positioned within each cell of the core strip in contact with a contacting crest and trough of said first and second portions of the foil strip and acts as a secondary weld electrode for the welding of each complementary crest and trough.

11. The machine of claim 10 wherein said welding means comprises an electrical resistance welding system having a plurality of banks of sets of vertically translatable weld wheels that are determinably vertically translated into rolling contact with the abutting crests and troughs of said first and second portions of said foil strip for electrical resistance welding together of said abutting portions.

12. The machine of claim 11 wherein each weld wheel forms a primary resistance weld element and each adjacent pin weld electrode forms a secondary weld element for each weld of abutting crests and troughs of the first and second portions of the foil strip.

13. The machine of claim 12 wherein each bank of spaced weld wheels is arranged horizontally in sets of vertically opposed horizontally spaced weld wheels that are vertically translatable in individual sets to perform electrical resistance welding of adjacent sets of contacting crests and troughs of portions of the foil strip, with the welding procedure for opposed sets of weld wheels being accomplished serially as a portion of the foil strip is positioned against a preceding portion by said guide means.

14. The machine of claim 13 wherein each upper and lower set of weld wheels is translatable vertically in a welding operation by an electrical motor means that is individually actuable in response to the horizontal travel of an end guide portion of the foil strip guide means whereby the positioning of the foil strip against a previously positioned portion of said foil strip and the subsequent welding together of said portions of the foil strip is accomplished in one continuous sequential motion.

15. The machine of claim 14 wherein said weld wheels of said sets are spaced sufficiently apart to permit said sets of vertically opposed welding wheels to be interleaved upon the vertical translation for a welding function whereby even weld forces are applied to the first and second portions of the foil strip.

16. The machine of claim 15 wherein said advancing means includes vertically and horizontally translatable upper and lower carriage beams to which said upper and lower banks of weld blocks are removably secured whereby upon completing the welding of a complete length of first and second portions for a honeycomb core having a discrete width, one of said carriage beams is vertically translated to withdraw all of the pin weld electrodes in the bank of weld blocks attached to said carriage beam from said honeycomb core and is horizontally advanced forward a predetermined distance and is thereafter vertically translated to reinsert said pin weld electrodes into the next horizontal row of cell positions of the honeycomb core in preparation for the positioning and welding of another portion of the foil strip.

17. The machine of claim 16 wherein the advancing means further provides for one carriage beam to translate one bank of weld blocks forwardly after withdrawal of said pin electrodes from the honeycomb core as the other carriage beam and the attached bank of weld blocks with the pin electrodes remaining inserted in the honeycomb core is translated rearwardly a predetermined distance to translate rearwardly that portion of the unitary honeycomb core that has been welded together.

18. The machine of claim 17 further includes upper and lower retainer bars that contact the upper and lower surfaces of the leading edge of the honeycomb core during its fabrication to preclude any tendency of the leading edge of the honeycomb core to be drawn upwardly or downwardly as a bank of pin weld electrodes is withdrawn from the honeycomb core and advanced forwardly.

19. The machine of claim 18 wherein each of said retainer bars is provided with spaced fingers which extend forwardly between the spaced pin weld electrodes of each set of weld blocks.

20. The machine of claim 17 wherein the machine further includes a main frame for operatively supporting said foil guiding means, foil receiving means, welding means and advancing means and, a table that is slantingly secured to said main frame for receiving said honeycomb core as it is fabricated and translated rearwardly by the rearward translation of a carriage beam and the associated sets of pin weld electrodes.

21. The machine of claim 17 wherein the machine further includes a main frame for operatively supporting said foil guiding means, foil receiving means, welding means and advancing means and, a table that is slantingly secured to said main frame for receiving said honeycomb core as it is fabricated and translated rearwardly by the rearward translation of a carriage beam and the associated sets of pin weld electrodes.

22. The machine of claim 21 wherein said foil guiding means and said welding means are associated and are hingedly connected to the main frame whereby said guiding means and welding means may be rotated upwardly to a predetermined position to permit access to other elements of the machine for maintenance and reconfiguration purposes.

23. A machine for rapidly fabricating a continuous length of honeycomb core having a discrete width and precise height, the honeycomb core being suitable for using in bonding in a honeycomb core panel structure substantially as fabricated, from a continuous strip of preformed metal foil having spaced crests and trough sections and adapted to be welded into a homey comb core having a discrete width and a precise height and comprising:

a main frame assembly having at least two horizontally extending vertically spaced main support beams;

a carriage beam operatively associated with each upper and lower main support beams;

a bank of sets of weld pin blocks operatively associated with each carriage beam and adapted to receive therebetween first and second serial portions of a continuous metal foil strip having spaced crest and trough sections at a determinable speed for a predetermined length in a reversible predetermined direction for the welding of said foil strip into a unitary honeycomb core;

guiding means to direct a continuous preformed metal foil strip having spaced crest and trough sections at a determinable speed for a predetermined length in a reversible predetermined direction between and in contact with vertically opposed faces of said weld pin blocks, which contact with said faces of said weld pin blocks providing for substantially precise vertical registry, for the welding of said foil strip into a honeycomb core;

welding means operatively associated with said carriage beams to weld together said contacting crests and troughs of said first and second portions of said continuously fed foil strip as predetermined horizontal portions thereof are brought into registry, and drive assembly means to translate rearwardly said welded portion of said honeycomb core whereby said guiding means may reverse the direction of directing said continuous foil strip to permit the welding together of further portions of said continuous foil strip into a unitary honeycomb core having a predetermined width and a precise height.

24. The machine of claim 23 wherein said guiding means comprises a fixed central feed foil guide portion and translatable guide portions, said translatable guide portions being reversibly horizontally translatable at a predetermined speed to position the foil strip in a predetermined position between said pin weld blocks.

25. The machine of claim 24 wherein said translatable guide portions are determinably rotatable to reverse the direction in which the foil strip is positioned.

26. The machine of claim 25 wherein said set of weld pin blocks is removably arranged horizontally on each carriage beam and is vertically biased into contact with said foil strip to maintain said first and second portions of said foil strip in vertical registry.

27. The machine of claim 26 wherein each pin weld block includes flange means, and the machine further includes horizontally translatable rotatable spreader means associated with the translating end wiper guide portions which cooperate with said flange means to urge opposing individual pin weld blocks vertically out of contact with the honeycomb core to permit a translating guide portion to position a portion of the foil strip against a previously positioned portion of the foil strip and thereafter, after horizontal passage of said translating guider portion and said spreader means, each biased individual pin weld guide block urges the contacted foil portions into vertical registry.

28. The machine of claim 27 wherein each of said weld blocks includes a plurality of horizontally arranged vertically extending pin weld electrodes, each said weld pin electrode being insertable in a cell formed by the horizontal registry of crests and troughs of first and second portions of the foil strip to provide a secondary weld electrode and to provide support for the walls of each cell during welding together of first and second portions of said metal foil by the welding together of said abutting crests and troughs.

29. The machine of claim 28 wherein said welding means comprises an electrical resistance welding system having a plurality of banks of sets of vertically translatable weld wheel electrodes, which sets are individually determinably vertically translated into rolling contact with the abutting crests and troughs of said first and second portions of said foil strip for electrical resistance welding together of the abutting portions.

30. The machine of claim 29 wherein each set of spaced weld wheels are arranged horizontally in sets of vertically opposed horizontally spaced weld wheels that are vertically translatable in individual sets to perform electrical resistance welding of adjacent sets of contacting crests and troughs of portions of the foil strip, with the welding procedure for opposed sets of weld wheels being accomplished serially as a predetermined horizontal portion of the foil strip is positioned against a preceding portion by said guide means.

31. The machine of claim 30 wherein each upper and lower set of weld wheels is translatable vertically in a welding operation by an electrical motor means that is individually actuable in response to the horizontal translation of the wiper end guide means to translate vertical said sets of upper and lower weld wheels serially whereby the positioning of a portion of the foil strip against a previously secured portion of the foil strip and the subsequent welding together of said portions of the foil strip is accomplished in one continuous sequential motion.

32. The machine of claim 23 wherein said drive assembly means further includes cam means associated with said carriage beams which is operative, upon welding a complete first portion of said continuous metal foil to a second portion of said foil, to vertically translate one carriage beam to withdraw from the welded honeycomb core all of the pin weld electrodes in the bank of weld blocks attached to said carriage beam and to translate horizontally forward a predetermined distance and translate vertically the bank of weld blocks to reposition said pin weld electrodes into the next horizontal row of cell positions of the honeycomb core in preparation for the positioning and welding of another portion of said continuous foil strip.

33. The machine of claim 32 wherein said cam means is operative upon the vertical and forward translation of one carriage beam to simultaneously translate rearwardly a predetermined distance the other carriage beam and the attached bank of weld blocks with its pin weld electrodes remaining inserted in the honeycomb core to translate rearwardly that portion of the unitary honeycomb core that has been welded together.

34. The machine of claim 33 further including upper and lower retainer bars associated with the main frame that contact the upper and lower surfaces of the leading portion of the honeycomb core during its fabrication to preclude any tendency of the leading edge of the honeycomb core to be drawn upwardly or downwardly as a set of pin weld electrodes is withdrawn from the honeycomb core and advanced forwardly.

35. The machine of claim 34 wherein the vertical spacing between said retainer bars and between said carriage beams is vertically adjustable to accommodate variable sizes of said weld blocks and variable widths of the continuous metal foil strip to provide a honeycomb core having a predetermined width.

36. The machine of claim 23 wherein individual weld blocks are removable from said upper and lower carriages to provide a honeycomb core having a predetermined variable width.

37. The machine of claim 23 wherein horizontally disposed horizontally translatable bending pin means are provided at each end of the horizontal travel of the foil guiding means to bend the continuous metal foil strip horizontally in a reverse direction from the direction in which it was being positioned as the translatable guide portions are rotated to position the crests and troughs of a portion of the metal foil strip against complementary crests and troughs of a previously positioned portion of the continuous foil strip.

38. The machine of claim 37 wherein at least one of said bending pin means is horizontally displaceable to accommodate the fabrication of honeycomb core of various predetermined widths.

39. The machine of claim 23 which further includes a table that is slantingly secured to said main frame for receiving said honeycomb core as it is fabricated and translated rearwardly by the aft translation of a carriage beam and the associated bank of pin weld electrodes.

40. The machine of claim 23 wherein said foil guiding means and said welding means are operatively associated and are hingedly connected to the main frame whereby the elements may be rotated upwardly to a predetermined position to permit access to the carriage beams for replacement of weld blocks as required for maintenance purposes or to remove individual weld blocks or sets of weld blocks to determine the width or height of the honeycomb core to be fabricated.

* * * * *